US012455089B2

(12) United States Patent
Amer et al.

(10) Patent No.: US 12,455,089 B2
(45) Date of Patent: Oct. 28, 2025

(54) AUTOMATIC WIRE DETECTION FOR SMART HVAC CONTROLLERS

(71) Applicant: DiversiTech Corporation, Duluth, GA (US)

(72) Inventors: Waseem Amer, Islamabad (PK); Muhammad Zeeshan Ashraf, Islamabad (PK); Aftab Farooqi, Redmond, WA (US); Anees Ahmed Jarral, Islamabad (PK); Umair Nawaz Khan, Punjab (PK)

(73) Assignee: DiversiTech Corporation, Duluth, GA (US)

( * ) Notice: Subject to any disclaimer, the term of this patent is extended or adjusted under 35 U.S.C. 154(b) by 389 days.

(21) Appl. No.: 18/193,486

(22) Filed: Mar. 30, 2023

(65) Prior Publication Data
US 2024/0263820 A1 Aug. 8, 2024

Related U.S. Application Data

(60) Provisional application No. 63/483,194, filed on Feb. 3, 2023.

(51) Int. Cl.
| F24F 11/49 | (2018.01) |
| F24F 11/32 | (2018.01) |
| F24F 11/63 | (2018.01) |
| F24F 11/88 | (2018.01) |
| G05B 19/042 | (2006.01) |
| H02H 9/02 | (2006.01) |
| H02H 9/04 | (2006.01) |

(52) U.S. Cl.
CPC .............. *F24F 11/49* (2018.01); *F24F 11/32* (2018.01); *F24F 11/63* (2018.01); *F24F 11/88* (2018.01); *G05B 19/042* (2013.01); *H02H 9/02* (2013.01); *H02H 9/04* (2013.01); *G05B 2219/2614* (2013.01)

(58) Field of Classification Search
CPC . F24F 11/49; F24F 11/32; F24F 11/63; H02H 9/02; H02H 9/04
See application file for complete search history.

(56) References Cited

U.S. PATENT DOCUMENTS

| 10,215,438 | B2* | 2/2019 | Dempsey | F24F 11/61 |
| 10,677,485 | B2* | 6/2020 | Poluri | F24F 11/30 |
| 2013/0204440 | A1* | 8/2013 | Fadell | F24F 11/46 |
| | | | | 700/276 |
| 2021/0190348 | A1* | 6/2021 | Sapak | F24F 11/89 |
| 2022/0136729 | A1* | 5/2022 | Murillo Carrasco | |
| | | | | G05D 23/1902 |
| | | | | 700/278 |
| 2022/0200658 | A1* | 6/2022 | Warren | H04B 3/542 |

* cited by examiner

Primary Examiner — Scott Bauer
(74) Attorney, Agent, or Firm — Dentons US LLP

(57) ABSTRACT

A system for smart HVAC controllers that is capable of automatically detecting and handling all HVAC control wires, whether the HVAC system is a single or dual transformer system. The system comprises a channel selector for selecting the various channels of an HVAC system for detection, one or more voltage and current limiters for conditioning channel signals for input to a microcontroller unit, a microcontroller comprising an intelligent detection algorithm for operating the channel selector and detecting and handling channel signals, and a one-way gate for protecting against damage from connection of two transformers during wire detection.

20 Claims, 14 Drawing Sheets

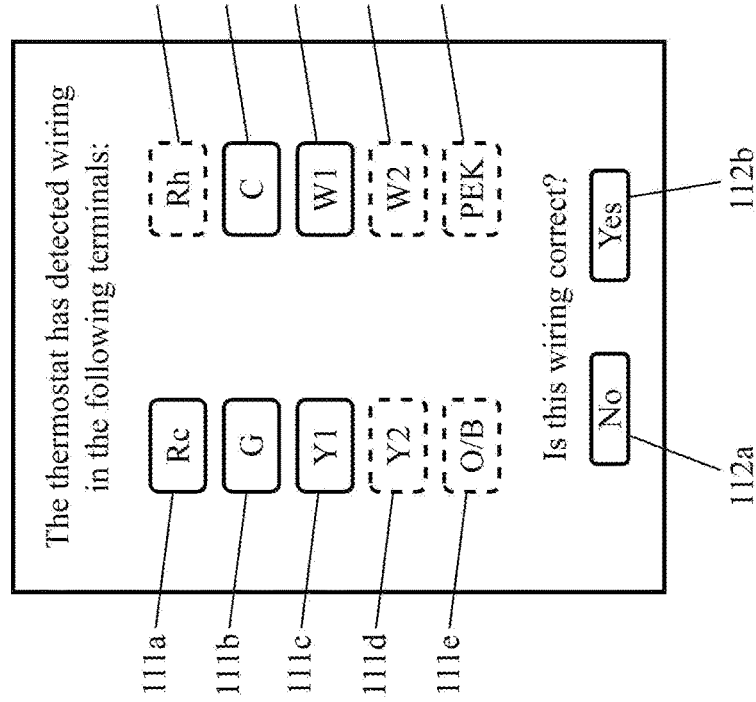
FIG. 1 (PRIOR ART)

Equipment Connection Truth Table 900

| Equipment Type | Rc | C | Rh | G | Y1 | Y2 | OB | W1 | W2 | Ref. | Rc-Rh | Comment |
|---|---|---|---|---|---|---|---|---|---|---|---|---|
| 901 Cooling Only - 1-stage | Rc | C |  | Y | Y |  |  |  |  |  |  | Rc & C from T1 |
| 902 Cooling Only - 2-stage | Rc | C |  | Y | Y | Y |  |  |  |  |  | Rc & C from T1 |
| 903 Heating Only - Conv. 1-stage (single transformer) | Rh | C2 |  | Y |  |  |  | Y |  |  | Y | Rh & C2 from T2, connect to Rc & C on thermostat |
| 904 Heating Only - Conv. 2-stage (single transformer) | Rh | C2 |  | Y |  |  |  | Y | Y |  | Y | Rh & C2 from T2, connect to Rc & C on thermostat |
| 905 Cooling & Heating - Heatpump 1-stage | Rc | C |  | Y | Y |  | Y |  |  |  |  | Rc & C from T1 |
| 906 Cooling & Heating - Heatpump 2-stage | Rc | C |  | Y | Y | Y | Y |  |  |  |  | Rc & C from T1 |
| 907 Cooling w/ Conv. Heating--1-stage (sing. trans) | Rc | C |  | Y | Y |  |  | Y |  | Y | Y | Rc & C from T1, connect to Rc to Rh on thermostat |
| 908 Cooling w/ Conv. Heating--2-stage (sing. trans) | Rc | C |  | Y | Y | Y |  | Y | Y | Y | Y | Rc & C from T1, connect to Rc to Rh on thermostat |
| 909 Cooling w/ Conv. Heating--1-stage (dual trans) | Rc | C | Rh | Y | Y |  |  | Y |  | Y |  | Rc & C from T1, Rh from T2 |
| 910 Cooling w/ Conv. Heating--2-stage (dual trans) | Rc | C | Rh | Y | Y | Y |  | Y | Y | Y |  | Rc & C from T1, Rh from T2 |

FIG. 9

AUTOMATIC WIRE DETECTION FOR SMART HVAC CONTROLLERS

CROSS-REFERENCE TO RELATED APPLICATIONS

Priority is claimed in the application data sheet to the following patents or patent applications, each of which is expressly incorporated herein by reference in its entirety: 63/483,194

BACKGROUND OF THE INVENTION

Field of the Art

The present invention is in the field of control systems for heating and air conditioning systems.

Discussion of the State of the Art

Installing a smart thermostat for a home heating, ventilation, and air conditioning (HVAC) system requires some electrical and HVAC knowledge. If the various wires that control HVAC systems are connected improperly to a smart thermostat, several negative outcomes can occur. Either the HVAC system will not work properly, or the circuitry of the smart thermostat can be damaged or, in a worst case scenario, the portions of the HVAC system itself can be damaged and have to be replaced. Currently available systems are capable only of partial detection of connected wires where a single transformer exists, and none are capable of automatically (without human intervention) detecting and handling the case where an HVAC system has two transformers, one for heating and one for cooling.

What is needed is a wire detection system for smart HVAC controllers that is capable of automatically detecting and handling all HVAC control wires, whether the HVAC system is a single or dual transformer system.

SUMMARY OF THE INVENTION

Accordingly, the inventor has conceived and reduced to practice, a system for smart HVAC controllers that is capable of automatically detecting and handling all HVAC control wires connected to it, whether the HVAC system is a single or dual transformer system. The system comprises one or more voltage and current limiters for conditioning channel signals for input to a microcontroller unit, a microcontroller comprising an intelligent detection algorithm for detecting and handling channel signals, and a controlled one-way gate for protecting against damage from the direct connection of two transformers during wire detection.

According to a preferred embodiment, a system for automatic wire detection and handling of Rc, Rh, and W wires for heating, ventilation, and air conditioning (HVAC) smart controllers is disclosed, comprising: a computing device comprising a processor, a memory, and a plurality of electrical pins, wherein: a first electrical input pin is electrically connected to a first wire terminal through a first voltage and current limiter circuit; a second electrical input pin is electrically connected to a second wire terminal through a second voltage and current limiter circuit; and a third electrical input pin is electronically connected to a third wire terminal through a third voltage and current limiter circuit; an internal ground comprising an electrical connection to the zero-volt direct current node of a alternating current (AC) to direct current (DC) rectifier configured to rectify an AC signal from a first transformer across the first terminal and the third terminal; a one-way gate comprising a diode configured to allow current to flow in a single direction from the internal ground through the second wire terminal toward a possible second transformer of the HVAC system, and a first electronically-controllable switch operable by the computing device to make and break an electrical connection between the internal ground and the possible second transformer through the diode; the first voltage and current limiter circuit, configured to reduce an electrical signal from the first HVAC system control wire to a voltage and current compatible with the first electrical input pin of the computing device; the second voltage and current limiter circuit, configured to reduce an electrical signal from the second HVAC system control wire to a voltage and current compatible with the second electrical input pin of the computing device; the third voltage and current limiter circuit, configured to reduce an electrical signal from the third HVAC system control wire to a voltage and current compatible with the third electrical input pin of the computing device; a detection algorithm comprising a plurality of programming instructions stored in the memory which, when operating on the processor, causes the computing device to: determine whether a first electrical signal exists on the first electrical input pin which is indicative of connection of a first HVAC system control wire to the first wire terminal; determine whether a second electrical signal exists on the second electrical pin which is indicative of connection of a second HVAC system control wire connected to the second wire terminal; close the one-way gate; re-determine whether a second electrical signal exists on the second electrical pin; and open the one-way gate.

According to another preferred embodiment, a system for automatic wire detection and handling of Rc, Rh, and W wires for heating, ventilation, and air conditioning (HVAC) smart controllers is disclosed, comprising: a computing device comprising a processor, a memory, an electrical input pin, and an electrical output pin; a channel selector comprising one or more electronically-controlled switches controllable by the electrical output pin configured to route signals from one or more HVAC control wires through a voltage and current limiter to the electrical input pin; an internal ground comprising an electrical connection to the zero-volt direct current node of a alternating current (AC) to direct current (DC) rectifier configured to rectify an AC signal from a first transformer across a first wire terminal and a third wire terminal; a one-way gate comprising a diode configured to allow current to flow in a single direction from the internal ground through the second wire terminal toward a possible second transformer of the HVAC system, and a first electronically-controllable switch controllable by the electrical output pin to make and break an electrical connection between the internal ground and the possible second transformer through the diode; a voltage and current limiter circuit configured to reduce an electrical signal from an HVAC system control wire to a voltage and current compatible with the electrical input pin of the computing device; a detection algorithm comprising a plurality of programming instructions stored in the memory which, when operating on the processor, causes the computing device to: make a first connection with a first wire terminal by selecting a channel using the channel selector, the first connection being routed from the first wire terminal through the voltage and current limiter circuit to the electrical input pin of the computing device; determine via the electrical input pin whether a first electrical signal exists on the first connection which is indicative of connection of a first HVAC system control wire to an HVAC system via the first terminal; make a second connection with a second wire terminal by selecting a channel using the channel selector, the second connection being routed from the second wire terminal through the voltage and current limiter circuit to the electrical input pin of the computing device; determine via the electrical input pin whether a second electrical signal exists on the second connection which is indicative of connection of a second HVAC system control wire to an HVAC system via the second terminal; close the one-way gate; re-determine via the electrical input pin whether a second electrical signal exists on the second connection; and open the one-way gate.

According to another preferred embodiment, a method for automatic wire detection and handling of Rc, Rh, and W wires for heating, ventilation, and air conditioning (HVAC) smart controllers is disclosed, comprising the steps of: operating a detection algorithm on a computing device comprising a processor, a memory, and one or more electrical input pins, the detection algorithm comprising a plurality of programming instructions stored in the memory which, when operating on the processor, causes the computing device to perform the steps of: making a first connection from a first wire terminal, through a voltage and current limiter circuit configured to reduce an electrical signal from an HVAC system control wire to a voltage and current compatible with an electrical input pin of the computing device, to that electrical input pin, and determining via that electrical input pin whether a first electrical signal exists on the first connection which is indicative of connection of the first HVAC system control wire to the first wire terminal; making a first connection from a first wire terminal, through a voltage and current limiter circuit configured to reduce an electrical signal from an HVAC system control wire to a voltage and current compatible with an electrical input pin of the computing device, to that electrical input pin, and determining via that electrical input pin whether a second electrical signal exists on the second connection which is indicative of connection of the second HVAC system control wire to the second wire terminal; determining via the electrical input pin whether a second electrical signal exists on the second connection which is indicative of connection of the second HVAC system control wire to the HVAC system; establishing an internal ground comprising an electrical connection to the zero-volt direct current node of a alternating current (AC) to direct current (DC) rectifier configured to rectify an AC signal from a first transformer across the first wire terminal and a third wire terminal; closing a one-way gate, the one-way gate comprising a diode configured to allow current to flow in a single direction from the internal ground through the second wire terminal toward a possible second transformer of the HVAC system, and a first electronically-controllable switch controllable by the electrical output pin to make and break an electrical connection between the internal ground and the possible second transformer through the diode; re-determining via the electrical input pin whether a second electrical signal exists on the second connection; and closing the one-way gate.

According to an aspect of an embodiment, the computing device further comprises a fourth electrical input pin being electrically connected to a fourth wire terminal through a fourth voltage and current limiter circuit; the system further comprises a fourth voltage and current limiter circuit, configured to reduce an electrical signal from the fourth HVAC system control wire to a voltage and current compatible with the fourth electrical input pin of the computing device; and the detection algorithm is further configured to cause the computing device to: determine whether a third electrical signal exists on the fourth electrical input pin which is indicative of connection of a fourth HVAC system control wire to the fourth wire terminal.

According to an aspect of an embodiment, the first HVAC system control wire is a 24V AC power wire for a first subsystem of the HVAC system; the second HVAC system control wire is a 24V AC power wire for a second subsystem of the HVAC system; the third HVAC system control wire is a ground wire for the 24V AC power wire of the first HVAC system control wire; and the fourth HVAC system control wire is a control wire for operating the second subsystem of the HVAC system.

According to an aspect of an embodiment, the first HVAC system control wire is the Rc wire of the HVAC system connected to the transformer; the first subsystem is a cooling coil of the HVAC system; the second HVAC system control wire is the Rh wire of the HVAC system; the second subsystem is a heating coil of the HVAC system; the third HVAC control wire is the C wire of the HVAC system connected to the transformer; the fourth HVAC control wire is the W wire of the HVAC system which controls operation of the heating coil.

According to an aspect of an embodiment, the system further comprises a second electronically-controllable switch between the Rh and Rc wires; and the detection algorithm is further configured to apply the following algorithm to classify the Rh and W HVAC system control wires: where neither the third electrical signal nor second electrical signal is detected: close the one-way gate to connect the internal ground to the Rh wire using the first electronically-controllable switch; recheck for the third electrical signal; and where the third electrical signal is detected upon recheck, associate both the Rh and W HVAC system control wires with the possible second transformer of the HVAC system; where the third electrical signal is detected but the second electrical signal is not, associate both the Rh and W HVAC system control wires with the first transformer of the HVAC system and connect the Rc and Rh HVAC system control wires via the shorting relay using the second electronically-controllable switch; and where either the third electrical signal and the second electrical signal are both detected; or the third electrical signal is not detected but the second electrical signal is detected; associate both the Rh and W HVAC system control wires with the first transformer of the HVAC system.

According to an aspect of an embodiment, the closure of the one-way gate is timed to further limit any potential damage to the computing device or HVAC system wherein: the closure of the one-way gate is long enough to capture at least two periods of, and no more than 10 periods of, any signal on the second HVAC control wire.

According to an aspect of an embodiment, the closure of the one-way gate is less than or equal to 100 milliseconds.

BRIEF DESCRIPTION OF THE DRAWING FIGURES

FIG. 1 (PRIOR ART) illustrates the inability of existing HVAC smart controllers to fully detect and handle HVAC wiring connections.

FIG. 9 is an illustration of an exemplary equipment connection truth table for connection of HVAC systems to terminals of a smart thermostat.

DETAILED DESCRIPTION OF THE DRAWING FIGURES

Figure 2:
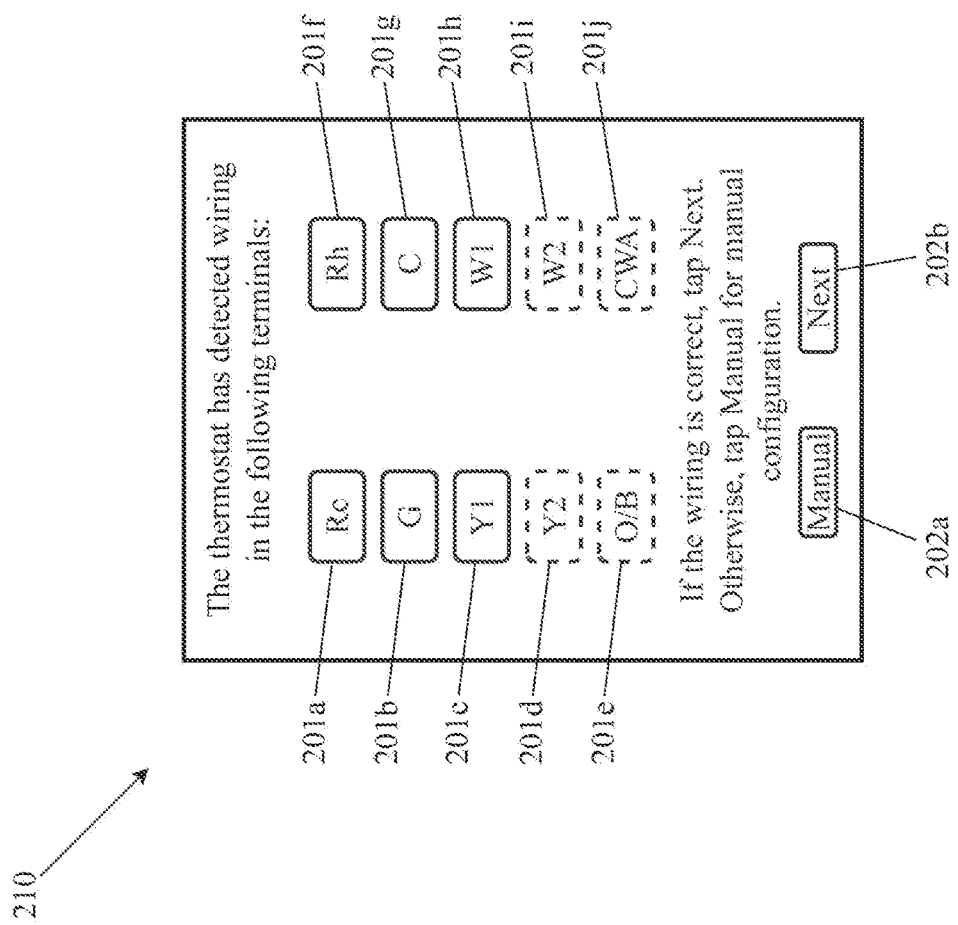
FIG. 2 illustrates the ability of an HVAC smart controller using the disclosures of the present invention to completely detect and handle HVAC wiring connections.

The inventor has conceived, and reduced to practice, a system for smart HVAC controllers that is capable of automatically detecting and handling all HVAC control wires, whether the HVAC system is a single or dual transformer system. The system comprises an input channel selector for selecting the various channels of an HVAC system for detection, one or more voltage and current limiters for conditioning channel signals for input to a microcontroller unit, a microcontroller comprising an intelligent detection algorithm for operating the input channel selector to detect and handle channel signals, an output channel selector for controlling various channels of HVAC system for operation, and a one-way gate for protecting against damage from connection of internal ground to the second transformer of HVAC system during wire detection.

Installing a smart thermostat requires some electrical and HVAC knowledge. If the various wires that control HVAC systems are connected improperly to a smart thermostat, several negative outcomes can occur. Either the HVAC system will not work properly, or the circuitry of the smart thermostat can be damaged or, in a worst case scenario, the portions of the HVAC system itself can be damaged and have to be replaced. Currently available systems are capable of only partial detection of connected wires where a single transformer exists, and none are capable of fully automatically detecting and handling the case where an HVAC system has two transformers, one for heating and one for cooling.

The partially-automated wire detection of existing systems assists homeowners in installing their smart thermostats. However, the homeowner must still confirm proper connection of certain wires, which the homeowner cannot properly do without some electrical knowledge, HVAC knowledge, and risk either to the smart thermostat or HVAC system. Even knowledgeable homeowners may not be willing to risk damage to the HVAC systems, requiring them to hire professionals to complete the installation and largely defeating the purpose of partially-automated wire detection.

Fully automatic detection and handling of HVAC control wires such as that described herein allows homeowners to install smart thermostats entirely without professional help, confident that the smart thermostat itself will be able to detect and handle (i.e., make appropriate connections between) HVAC wires plugged into the smart thermostat. Fully automatic detection and handling of HVAC control wires makes smart thermostats essentially "plug and play" without the risk of non-operation or damage either to the smart thermostat or the HVAC system itself. Even where a professional HVAC installer is used, the automatic detection can assist HVAC installers who are unfamiliar with the operation of smart thermostats (or can just simply install by automatically confirming that everything is set up properly).

The phrase "heating, ventilation, and air conditioning" or "HVAC" refers in the HVAC industry to systems for heating, ventilation, and/or air conditioning systems of buildings, meaning any single aspect or any combination of those aspects. HVAC systems are controlled by a thermostat which, in the simplest of cases, is a physical analog switch with a bi-metal coiled spring which makes and breaks electrical contact as it expands and contracts due to changes in air temperature. When the electrical contact is made, the relevant system (e.g., heating) is turned on, along with a fan that blows warmed air from the heater throughout the building.

Modern smart thermostats are computer-controlled devices that allow for more sophisticated control of a variety of aspects of HVAC systems. In order for smart thermostats to work properly and, more importantly, to avoid damage either to the thermostat or to the HVAC system itself, the various wires that control the HVAC system must be properly connected to the smart controller and the smart controller must understand which wires have been connected to which terminals of the smart controller.

HVAC systems have either heating, cooling, or both, plus a fan or blower to circulate the warm or cooled air, typically via ducting that goes to various rooms or areas in the building. HVAC systems are powered either by one or two transformers. In the case of a single-transformer system, either the heating system, or the cooling system, or both, can be powered by the transformer. In the case of a dual-transformer system, the heating system is powered by one transformer and the cooling system is powered by a different transformer. In the case of a dual-transformer system, only the Rh wire of the second transformer is connected to the smart thermostat, meaning that there is not a corresponding C wire for the second transformer that the smart thermostat can use to determine whether a second transformer exists.

HVAC systems have a number of different control wires. Common shorthand symbols for the primary wires are as follows:

Rc (sometimes R)—An abbreviation of "red cooling," this wire provides the 24V AC power for the cooling system.

Rh—An abbreviation of "red heating," this wire provides the 24V AC power for the heating system.

G—Fan or blower (not ground).

C—An abbreviation of "common," this wire provides the common or ground for the 24V AC power.

Y (sometimes Y1, Y2 in two-stage systems)—Turns air conditioning on and off.

W (sometimes W1, W2 in two-stage systems)—Turns heating on and off.

O, B, or O/B—Controls the changeover valve in heat pump systems. O switches the valve from heating to cooling and B switches the valve from cooling to heating. Sometimes these are combined into a single O/B wire.

Other wires may exist such as X or AUX for auxiliary heating/cooling systems, E for emergency systems, ACC for humidifiers and other accessory equipment, PEK for power extension kits for activating a third fan speed of multi-speed fan systems, L for indicator lights, CWA for common wire adapter, and S for external sensors.

While the descriptions herein assume that the cooling system and its associated wires (e.g., Rc, Y, etc.) are the primary subsystem and that the heating system and its associated wires (e.g., Rh, W, etc.) are the secondary system, this assumption is for clarity and ease of understanding only and is not intended to be limiting. The descriptions herein apply equally to situations where the heating system is primary and the cooling system is primary, or where other equipment (e.g., auxiliary heating/cooling, or emergency heating/cooling) is present, whether or not powered by the same or different transformers.

Inadvertent connection of the two transformers of a dual-transformer system is a major risk in automatic detection systems, and is a primary reason why existing smart thermostats cannot perform fully automated wire detection and handling. In the case of a single-transformer system, some smart thermostats can automatically detect the wiring, including the W wire for controlling heating. However, the installer must still manually specify whether the power for the heating equipment comes from a separate power source (i.e., Rh) or from the same source (i.e., Rc). In the case of a dual-transformer system, the W wire connected to the smart thermostat cannot be detected by the smart thermostat because of the lack of a C wire to the second transformer (thus resulting in an open circuit). Here, the installer must manually specify that the W and Rh wires exist and identify the terminals of the smart thermostat to which they are connected.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

DETAILED DESCRIPTIONS OF DRAWINGS

FIG. 1 (PRIOR ART) illustrates the inability of existing HVAC smart controllers to fully detect and handle HVAC wiring connections. Current smart thermostats only partially detect HVAC wiring connected to them.

The partially-automated wire detection of existing systems assists homeowners in installing their smart thermostats. However, the homeowner must still confirm proper connection of certain wires, which the homeowner cannot properly do without some electrical knowledge, HVAC knowledge, and risk either to the smart thermostat or HVAC system. Even knowledgeable homeowners may not be willing to risk damage to the HVAC systems, requiring them to hire professionals to complete the installation and largely defeating the purpose of partially-automated wire detection.

Inadvertent connection of the two transformers of a dual-transformer system is a major risk in automatic detection systems, and is a primary reason why existing smart thermostats cannot perform fully automated wire detection and handling. In the case of a single-transformer system, some smart thermostats can automatically detect the wiring, including the W wire for controlling heating. However, the installer must still manually specify whether the power for the heating equipment comes from a separate power source (i.e., Rh) or from the same source (i.e., Rc). In the case of a dual-transformer system, the W wire connected to the smart thermostat cannot be detected by the smart thermostat because of the lack of a C wire to the second transformer (thus resulting in an open circuit). Here, the installer must manually specify that the W and Rh wires exist and identify the terminals of the smart thermostat to which they are connected.

A first exemplary screenshot 110 shows the operation of an exemplary existing smart thermostat with partial wire detection in the case of a single-transformer HVAC system. The smart thermostat has correctly identified that wires Rc 111a, G, 111b, Y1 111c, C 111g, and W1 111h are connected to the smart thermostat in their proper terminals. It has also correctly identified that no wires are connected to its terminals for Yw 111d, O/B 111e, W2 111i, and PEK 111j. However, it cannot determine whether or not an Rh wire is connected at the port for Rh 111f, and therefore must ask the user to manually confirm whether the wiring is correct 112a, 112b.

A second exemplary screenshot 120 shows the operation of another exemplary existing smart thermostat with partial wire detection in the case of a dual-transformer HVAC system. In this case, the smart thermostat's operation is even simpler, detecting only whether wires are detected at the Rc and Rh terminals of the smart controller, and asking the user to manually specify whether wires are connected at both terminals 121a, 121b. In this case, either there is no Rh wire connected to the Rh terminal or there is an Rh wire connected to the Rh terminal, but it is on a second transformer and therefore cannot be detected because of the lack of a C wire for the second transformer connected to the smart thermostat to provide a ground (and thus a complete circuit).

FIG. 2 illustrates the ability of an HVAC smart controller using the disclosures of the present invention to completely detect and handle HVAC wiring connections. A first exemplary screenshot 210 of a smart thermostat using the system disclosed herein detects all HVAC wires automatically and without the extra step for the user via an electronic detection system, wire identification algorithm, and circuitry which allows safely making and breaking connections between the Rc, C, and Rh connections in a dual-transformer system, and identification of the existence of a second transformer.

A first exemplary screenshot 210 shows the operation of an exemplary smart thermostat with full wire detection and handling. The smart thermostat has correctly identified that wires Rc 201a, G, 201b, Y1 201c, C 201g, W1 201h, and Rh 201f are connected to the smart thermostat in their proper terminals. It has also correctly identified that no wires are connected to its terminals for Yw 201d, O/B 201e, W2 201i, and CWA 201j. The wires have been fully detected and handled. The appropriate wires have been associated with their corresponding smart thermostat functions, any necessary jumper connections have been made (either internally within the smart thermostat or detected as being externally connected), and single-transformer/dual-transformer power has been accounted for. The installer need do nothing else and can simply click "next" 202b to move on to other settings for the smart thermostat or can optionally perform manual wire selection by clicking "manual" 202a. The installer's confirmation of the correctness is a convenience and is not required, as the smart thermostat has fully detected and handled all HVAC wiring.

Figure 3:
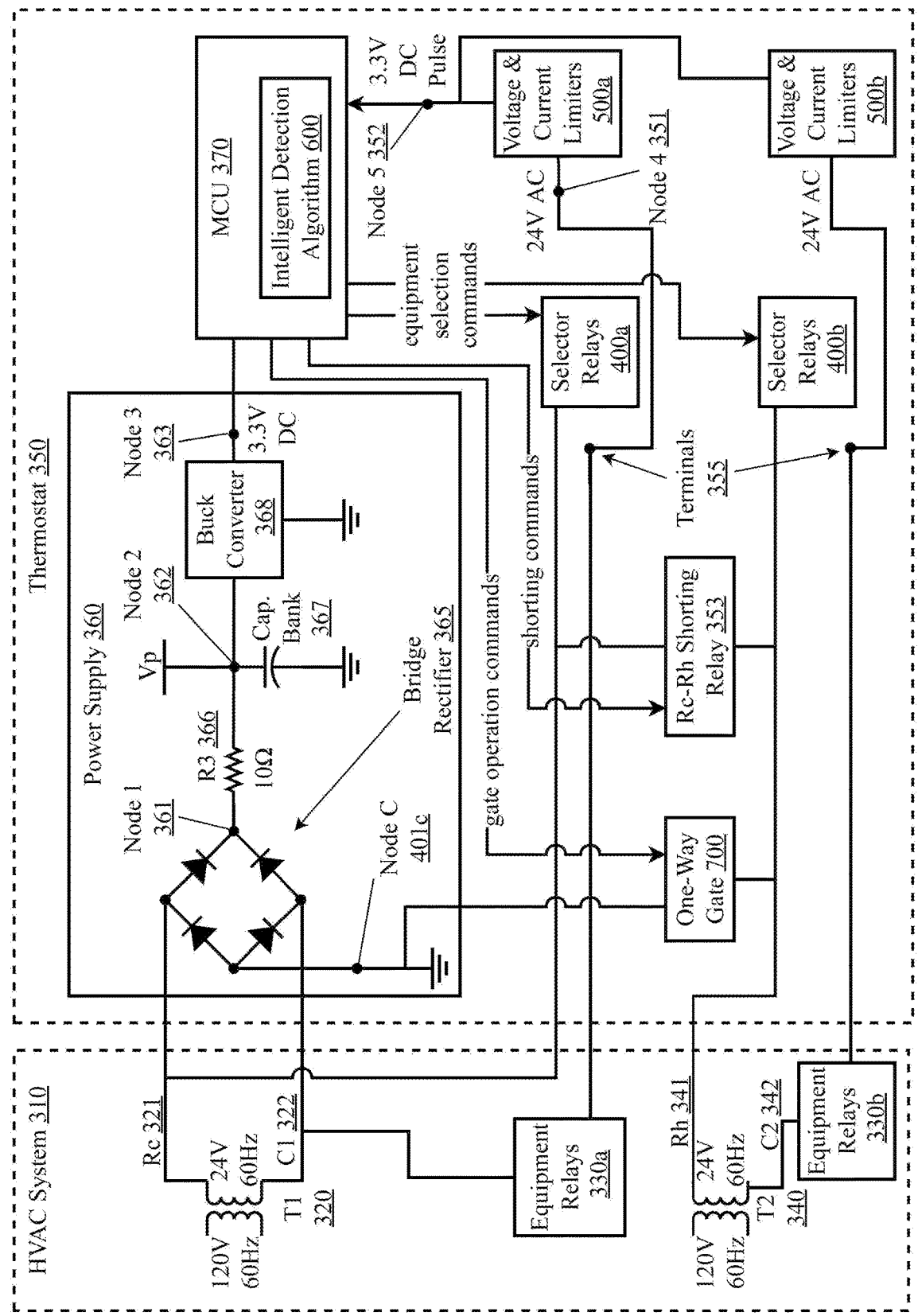
FIG. 3 is an exemplary overall schematic of a system for automatic wire detection and handling for HVAC smart controllers.

FIG. 3 is an exemplary overall schematic of a system for automatic wire detection and handling for HVAC smart controllers. In this diagram, an exemplary dual-transformer HVAC system 310 is shown, comprising a first transformer T1 320, one or more equipment relays 330a controlling subsystems of HVAC system 310 connected to T1 320, a second transformer T2 340, with one or more equipment relays 330b controlling subsystems of HVAC system 310 connected to T2 340. An exemplary smart thermostat 350 with fully automatic wire detection and handling is shown comprising a power supply 360, selector relays 400a for triggering equipment relays 300a on T1 320, a selector relays 400b for triggering equipment relays 300b on T2 340, one or more voltage and current limiters 500a for T1 320, one or more voltage and current limiters 500b for T2 320, a microcontroller unit 370 having an intelligent detection algorithm 600, an Rc-Rh shorting relay 353, and a one-way gate for connection to the Rh wire 341 of second transformer T2 340.

First transformer T1 320 provides power for the cooling subsystem of HVAC system 310. T1 320 receives household mains current (here 120V alternating current (AC) at 60 Hz which is the U.S. standard) and transforms it to 24V alternating current (AC) at 60 Hz providing power to wire Rc 321 with a common wire C1 322.

Equipment relays 330a connect power from T1 320 to various subsystems of HVAC system 310 such as blower/fan (G), air conditioning on/off (Y/Y1/Y2), changeover valve (OB), common wire adapter (CWA), etc.

Second transformer T2 340 provides power for the heating subsystem of HVAC system 310. T2 340 receives household mains current (here 120V alternating current (AC) at 60 Hz which is the U.S. standard) and transforms it to 24V alternating current (AC) at 60 Hz providing power to wire Rh 341 with a second common wire C2 342. In dual-transformer systems such as that shown here, at least one additional relay (not shown) will provide power to a subsystem powered by T2 340, in this case to a W wire (not shown) which controls heating.

Equipment relays 330b connect power from T2 340 to various subsystems of HVAC system 310 such as heating on/off (W/W1/W2).

Note that in standard configurations, only the Rh wire 341 from T2 340 is connected to smart thermostat 350, and that C2 342 is not connected to the smart thermostat, meaning that smart thermostat cannot detect Rh wire 341 from T2 340 directly because of the lack of a completed circuit. Smart thermostat 350 described herein solves this problem by creating an internal ground at Node C 401c of power supply 360 to which Rh 341 can be connected (via protective circuitry) to complete the circuit to detect a signal from Rh 341. Use of this internal ground Node C 401c to detect Rh 341 allows MCU 370 to determine whether a single transformer or dual transformers are used by applying an algorithm as described later herein.

Smart thermostat 350 is a thermostat for controlling HVAC systems, having wire terminals for connection of HVAC system control wires. Typically, smart thermostat 350 will have one wire terminal on the back of the unit for each connection of Rc, G, Y1, Y2, O/B, C, Rh, W1, W2, and PEK (power extension kit) wires, but may have more or fewer wires, depending on the unit's configuration. Other wire terminals that may exist include, but are not limited to X or AUX for auxiliary heating/cooling systems, E for emergency systems, ACC for humidifiers and other accessory equipment, PEK for power extension kits for activating a third fan speed of multi-speed fan systems, L for indicator lights, CWA for common wire adapter, and S for external sensors.

Microcontroller (MCU) 370 can be any computing device suitable for the purpose. MCUs used for devices such as smart thermostat 350 are typically less powerful computing devices purpose-built or specially programmed for the intended purpose. MCUs will typically have a processor, a random access (volatile) memory, firmware installed onto a flashable (non-volatile) memory, and input/output pins or ports for connection to various wires, sensors, peripherals, or other accessories. Depending on configuration, signals may be passed to a single input pin of MCU either via a channel selector such as a multiplexer or may be passed to multiple input pins of MCU.

Power supply 360 converts 24V AC power from T1 320 to a constant 3.3V DC for safely powering MCU 370. It further provides an internal ground at Node C 401c which represents a fully rectified signal from C1 322 for use in comparing Rc 321 to Rh 341 for detection of single or dual transformers. 24V AC power from T1 320 is passed through a bridge rectifier 365 to convert the alternating current (AC) power to a fully rectified direct current (DC) positive power source at Node 1 361 which is then passed through a low value resistor R3 366 to limit initial current spikes during initial charging of a capacitor bank 367. Capacitor bank 367 comprising one or more capacitors in parallel is used to smooth the rectified current at Node 2 362 (also Vp). The smoothed, positive, current-limited power is then passed through a Buck converter 368 to provide a constant 3.3V direct current (DC) at Node 3 363 to power MCU 370.

Node C 401c is a 0V DC ground created by passing of the 24V AC signal (as measured by root mean square (RMS); peak voltage is 36V) of Rc 321 through a bridge rectifier for full-wave rectification into a positive 24V RMS signal and then smoothing of the rectified signal into DC via a capacitor bank 367. While Node C 401c may have some residual AC signal associated with it, from a DC standpoint, it is 0V DC. The internal ground of Node C 401c can then be used as a reference point for detection of signals from the various from any HVAC wires connected to thermostat 350 at terminals 355, including Rh 341. Internal ground Node C 401c allows thermostat 350 to complete a circuit from Rh 341 to ground even though only the Rh 341 wire is connected to thermostat 350 and not C2 342 as is the typical method for HVAC installation.

Intelligent detection algorithm 600, installed on MCU 370 as firmware, inputs from equipment relays 330a, b one or more voltage and current limiters 500a,b receive the 24V AC signal from each connection at Node 4 351 and convert them to a 3.3V DC pulse waveform at Node 5 352 for receipt by MCU 370 and processing through intelligent detection algorithm 600. When intelligent detection algorithm 600 instructs the protective circuit of one way gate 700 to connect internal ground Node C 401c to Rh 341, the internal ground Node C 401c connects with signal Rh 341 to form a reference for measuring signals from the connections through equipment relays 330b on the second transformer T2 340 through the voltage or current limiters 500b to MCU 370, while on the other side also to avoid damage caused by connection of T1 320 with T2 340. Switches within selector relays 400a,b, one-way gate 700, and Rc-Rh shorting relay 353 are each controlled by connections to MCU 370 allowing MCU 370 to issue gate operation commands, shorting commands, and channel selection commands at the instruction of intelligent detection algorithm 600.

While this exemplary architecture uses a microcontroller 370 and "an" intelligent detection algorithm for the sake of clarity, these terms are not meant to be limiting and any computing device may be used in conjunction with any number of detection algorithms.

Figure 4:
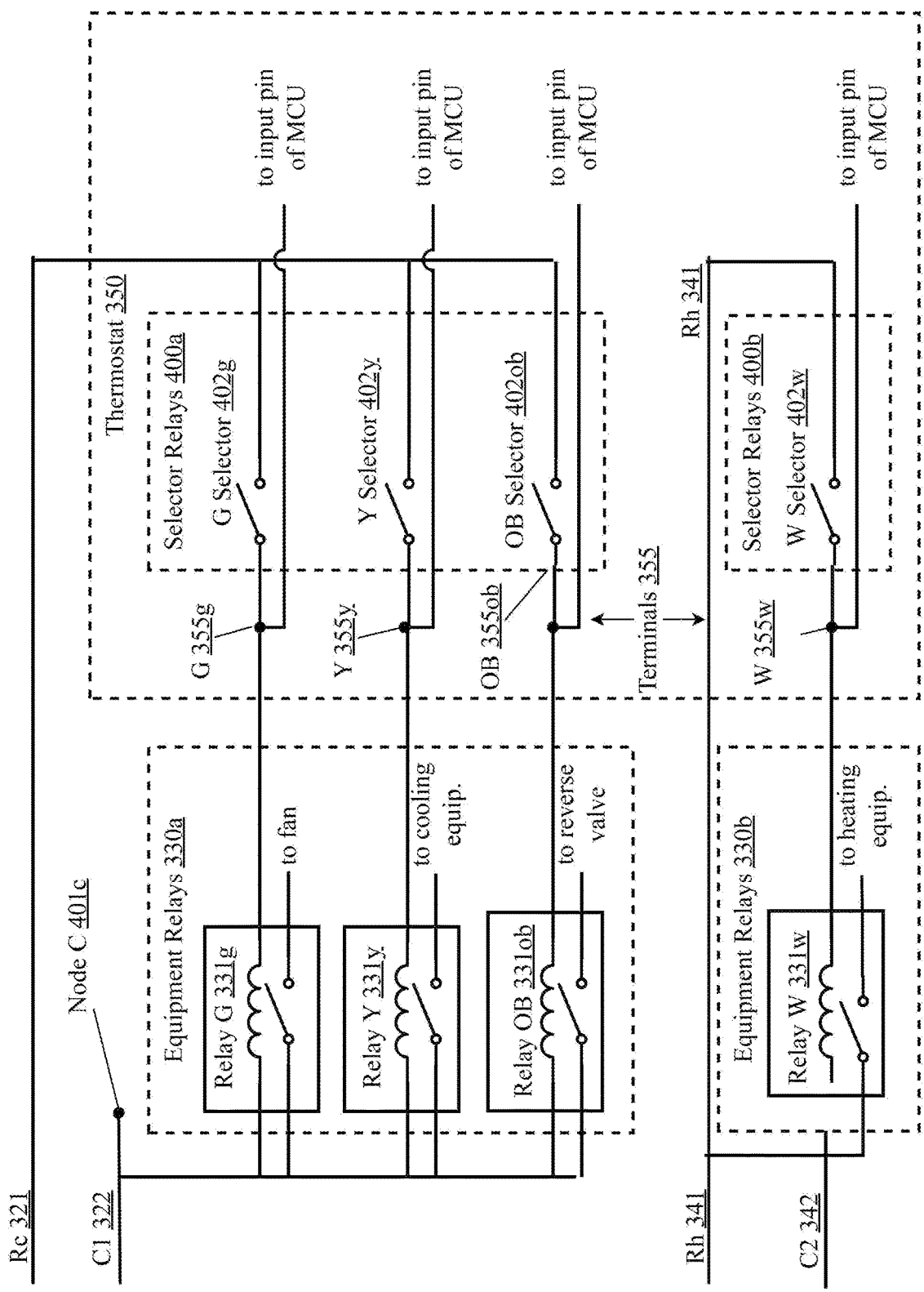
FIG. 4 is a diagram illustrating an exemplary channel selector aspect of a system for automatic wire detection and handling of HVAC smart controllers.

FIG. 4 is a diagram illustrating an exemplary channel selector aspect of a system for automatic wire detection and handling of HVAC smart controllers. Here, more detail is shown of equipment relays 330a,b and selector relays 400a,b aspects. MCU 370, at the direction of intelligent detection algorithm 600, senses the various wires of HVAC system 310, through the voltage and current limiters 500a,b; where each wire represents a channel or signal of HVAC system 310, to determine which wires of HVAC system 310 are connected to which terminals of smart thermostat 350.

Control signals in from MCU are received by selector relays 400a and operate switches 402g, 402y, 402ob, 402w which trigger (i.e., turn on and off) equipment relays 331g, 331y, 331ob, 331w for the various subsystems of HVAC system 310, causing the relays 331g, 331y, 331ob, 331w to activate various subsystems of the HVAC system 310. Even while the switches (shown with the symbol for switches) of equipment relays 331g, 331y, 331ob, 331w are turned off, the coils (shown with the symbol for inductors) are still electrically connected to their respective transformers and pass through signals across their respective wires connected at terminals G 355g, Y 355y, OB 355ob, and W 355w which are connected at their respective wire terminals of thermostat 350. Thus, the input pins of MCU 370 are electrically connected through voltage and current limiter 500) to MCU to terminals G 355g, Y 355y, OB 355ob, and W 355w, and HVAC wires connected to these terminals can be detected regardless of the state of selector relays 400a,b and equipment relays 300a,b. In the case of wires coming from T2 340, the one-way gate 700 (not shown in this diagram) is activated to create a reference and to protect against damage caused by connection of T1 320 and T2 340, and then the signals across wires like 355w are measured through the voltage and current limiters. In the case of wires coming from T1 320, the signal is in the form of a AC signal (as measured by root mean square (RMS) voltage; peak voltage is 36V) which is later converted by voltage and current limiters 500a,b into a 3.3V DC pulse at Node 5 352 for input into MCU 370 and use by intelligent detection algorithm 600.

Node C 401c acts as an internal ground for wire detection. Node C 401c is a 0V DC ground created by passing of the 24V AC signal (as measured by root mean square (RMS); peak voltage is 36V) of Rc 321 through a bridge rectifier for full-wave rectification into a positive 24V RMS signal and then smoothing of the rectified signal into DC via a capacitor bank 367. The internal ground of Node C 401c can then be used as a reference point for detection of signals from the various equipment channels, including Rh 341. The internal ground Node C 401c allows thermostat 350 to complete a circuit from Rh 341 to ground even though only the Rh 341 wire is connected to thermostat 350 and not C2 342 (as is the typical method for HVAC installation).

The 24V AC signals passing through the coils of equipment relays 330a,b at Node 4 351 are converted to a 3.3V DC pulse waveform at Node 5 352 for receipt by MCU 370 and processing through intelligent detection algorithm 600. Rh 341 is connected to internal ground Node C 401c through a protective circuit comprising a one-way gate 700 between Rh 341 and the internal ground Node C 401c on one side and a voltage or current limiter 500 to MCU 370 on the other side so as to avoid damage caused by connection of T1 320 with T2 340.

Intelligent detection algorithm 600, installed on MCU 370 as firmware, classifies signals received at wire terminals 355 from the coils of equipment relays 330a,b as is further described herein below.

Figure 5:
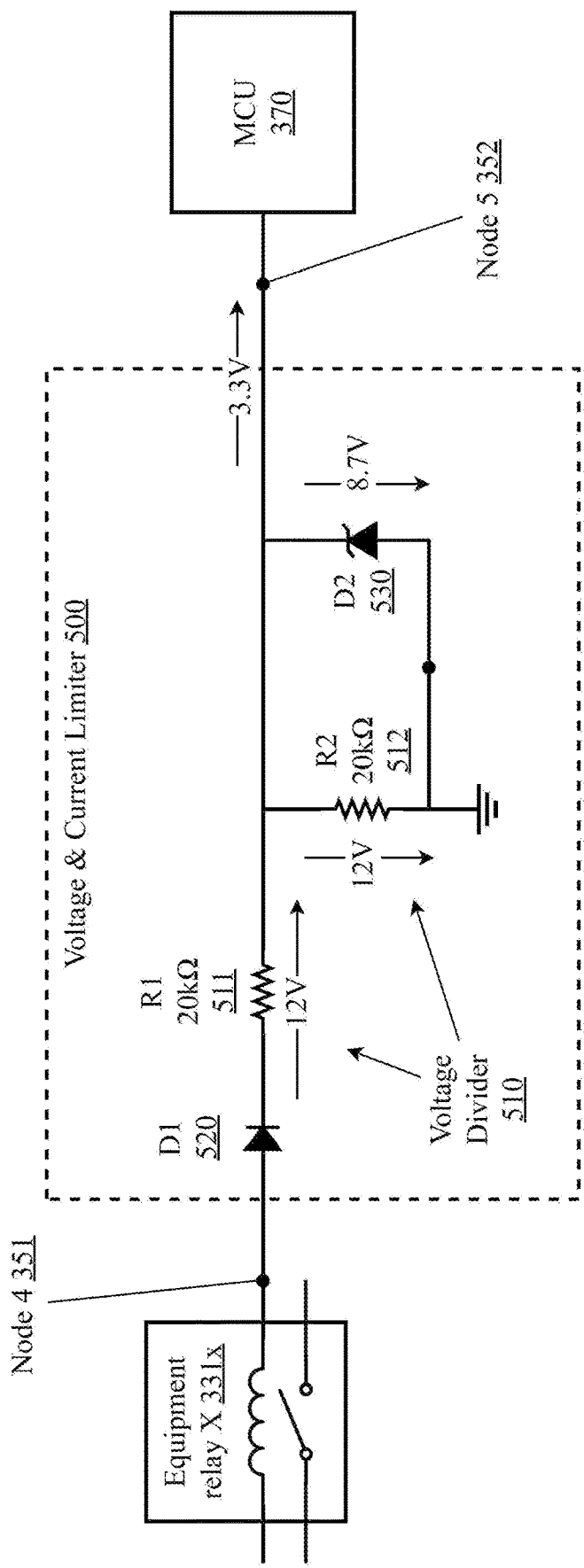
FIG. 5 is a schematic of an exemplary voltage and current limiter aspect of a system for automatic wire detection and handling of HVAC smart controllers.

FIG. 5 is a schematic of an exemplary voltage and current limiter aspect of a system for automatic wire detection and handling of HVAC smart controllers.

Voltage and current limiters 500a,b are used to condition the voltage and current coming from each channel during wire detection. A single voltage and current limiter can be used, switching the signal for each wire through it as the wire is selected (e.g., using a multiplexer for line selection to pass through a signal to a single electrical input pin of the MCU) or a separate voltage and current limiter can be used for each wire (i.e., passing through signals from each wire to separate electrical input pins of the MCU). When comparing Rc with Rh for purposes of detecting a phase shift, however, either separate voltage and current limiters 500 must be used for the signals from each of Rc and Rh so as to maintain separate signals for phase shift comparison or a different algorithm must be used (e.g., detecting not phase shift, but lengthened or shortened pulses in the combined signal) to identify both Rc and Rh on the same conditioned signal.

In this exemplary diagram, a signal is shown coming from an arbitrary equipment relay X 331x having a 24V AC waveform at Node 4 351. The signal passes through a diode D1 520 which converts the signal to a half-rectified 24V wave signal (and also preventing reverse current flow through the circuit). The signal then passes through a voltage divider 510 comprising two resistors (in this case of equal value) R1 511 and R2 512. The voltage between the resistors at Node 5 352 is clamped (dropped) to a constant 3.3V by placing a Zener diode D2 520 in the reverse direction of the current. When a Zener diode is placed in the reverse direction of a current, it resists passing current through itself up to a specified voltage (in this case 3.3V) and then passes through substantially all current above that specified voltage. In this way, the Zener diode clamps the voltage at Node 5 352 to a maximum of 3.3 v for processing by MCU 370. As the input to D2 530 is a half-rectified 12V wave, the output at Node 5 352 will be a substantially square wave 3.3 v pulsed signal.

Figure 6:
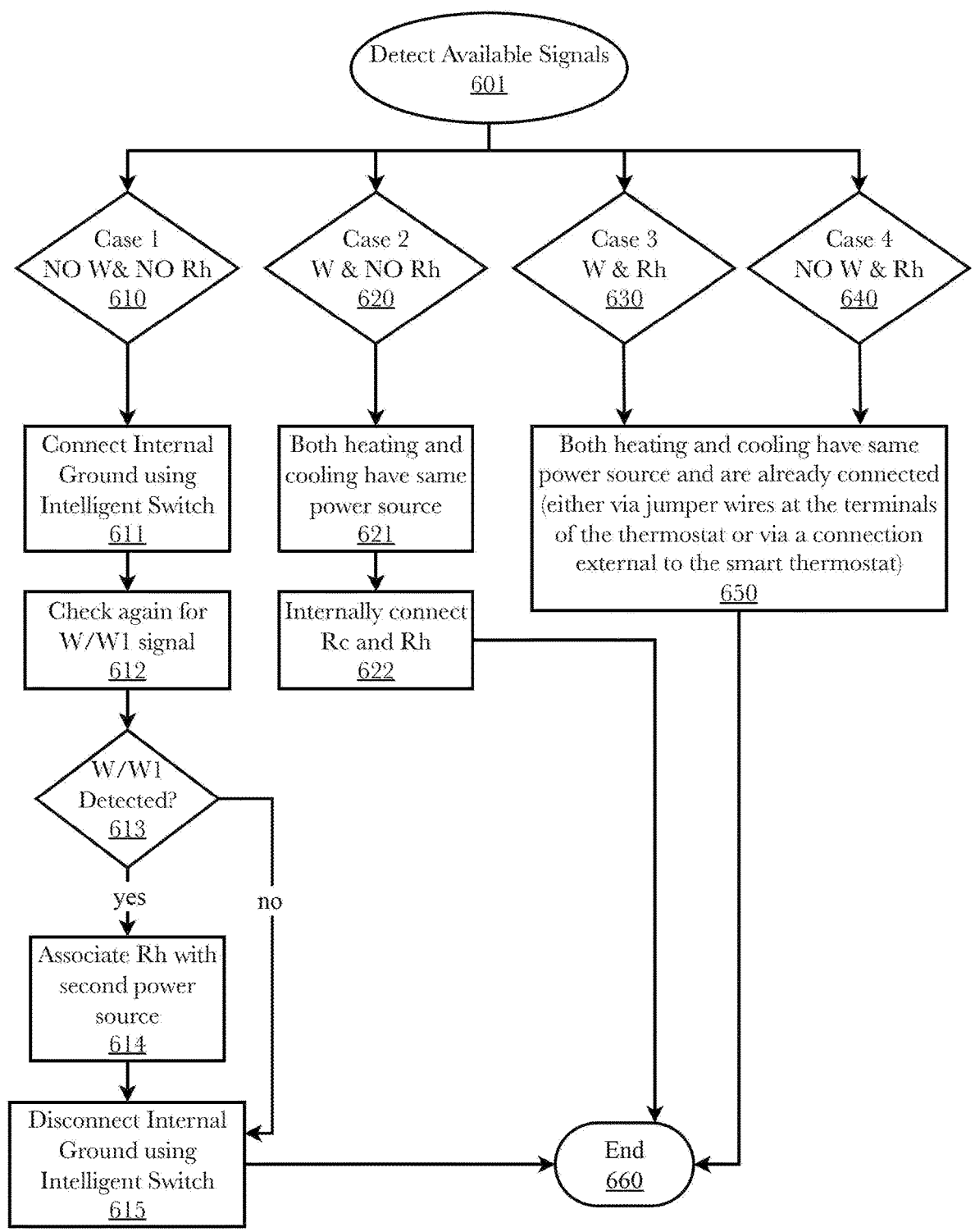
FIG. 6 is a flow diagram illustrating an exemplary algorithm for automatic wire detection for HVAC smart controllers.

FIG. 6 is a flow diagram illustrating an exemplary algorithm for automatic wire detection and handling for Rh 341 and W 355w wires. This algorithm handles the detection and handling of Rh 341 and W 355w wires including determination of whether Rh 341 and W 355w are on the same transformer as Rc 322 or a different one. This is the primary case that existing smart thermostats cannot properly handle. This algorithm is not limiting and other detection and handling algorithms may be used.

In this exemplary algorithm, intelligent detection algorithm 600 is programmed to examine four cases: Case 1 610 (NO W & NO Rh), Case 2 620 (W & NO Rh), Case 3 630 (W & Rh), and Case 4 640 (NO W & Rh). Each of these cases indicates a different wiring setup (although the handling of Case 3 630 and Case 4 640 end up being the same). For simplicity, these cases address only W 355w wire, but this implies either W 355w or W1.

At an initial step 601, each terminal of smart thermostat 350 is checked using to detect available signals. For wires on the transformer T1 320 (e.g., Rc 322, G 355g, Y 355y, OB 355ob, etc.) this detection is straightforward and if a signal is detected, the wire is classified accordingly. However, for the case of Rh 341 and W 355w, the situation is more complicated. Depending on the HVAC configuration, these wires may or may not be detected and may or may not be associated with a second transformer. Therefore, the four cases 610, 620, 630, 640 are analyzed to determine which configuration is in use and protective circuitry (one-way gate 700 and voltage and current limiter 500) are used to ensure that no damage occurs when connecting Rh 341 and W 355w for detection.

In Case 1 610 (NO W & NO Rh), no W 355w is detected and no Rh 341 is detected. At step 611, 355w Rh 341 is then connected to the internal ground, Node C 401c, using and one-way gate 700, and W 355w is again checked for a signal at step 612. If W 355w is detected at step 613, this indicates that a dual-transformer situation exists, meaning that Rh 341 and W 355w are on a separate transformer from Rc 322. If W is not detected at step 613, the internal ground is disconnected 615 and algorithm ends 660. At step 614, Rh 341 is associated internally within smart thermostat 350 with the second transformer. At step 615, 355w Rh 341 is disconnected from the internal ground, Node C 401c.

In Case 2 620 (W & NO Rh), W 355w is detected, but no Rh 341 is detected. This indicates a determination at step 621 that a single-transformer situation exists and means that both Rc 322 and Rh 341 are powered by the same transformer, but are not yet connected (either via jumper wires at the terminals of the thermostat or via a connection external to the smart thermostat). After this determination, smart thermostat 350 internally connects Rc 322 and Rh 341 at step 622. Note that this automatic internal connection (also known as a jumper) is different from existing systems which require an external connection or jumper.

In Case 3 630 (W & Rh), W 355w is detected and Rh 341 is also detected. Since the one-way gate 700 is not yet used, this indicates a determination at step 650 that a single-transformer situation exists and means that both Rc 322 and Rh 341 are powered by the same transformer and are already connected (either via jumper wires at the terminals of the thermostat or via a connection external to the smart thermostat). No internal connection of Rc 322 and Rh 341 is needed.

In Case 4 640 (NO W & Rh), no W 355w is detected and Rh 341 is detected. Similarly to Case 3 630, this indicates a determination at step 650 that a single-transformer situation exists and means that both Rc 322 and Rh 341 are powered by the same transformer and are already connected (either via jumper wires at the terminals of the thermostat or via a connection external to the smart thermostat). No internal connection of Rc 322 and Rh 341 is needed.

Once the four cases above have been analyzed and wires have been detected and handled appropriately (i.e., association of Rh 341 with second power source 322e, internal connection of Rc 322 and Rh 341, etc.), the algorithm ends at 660.

Figure 7:
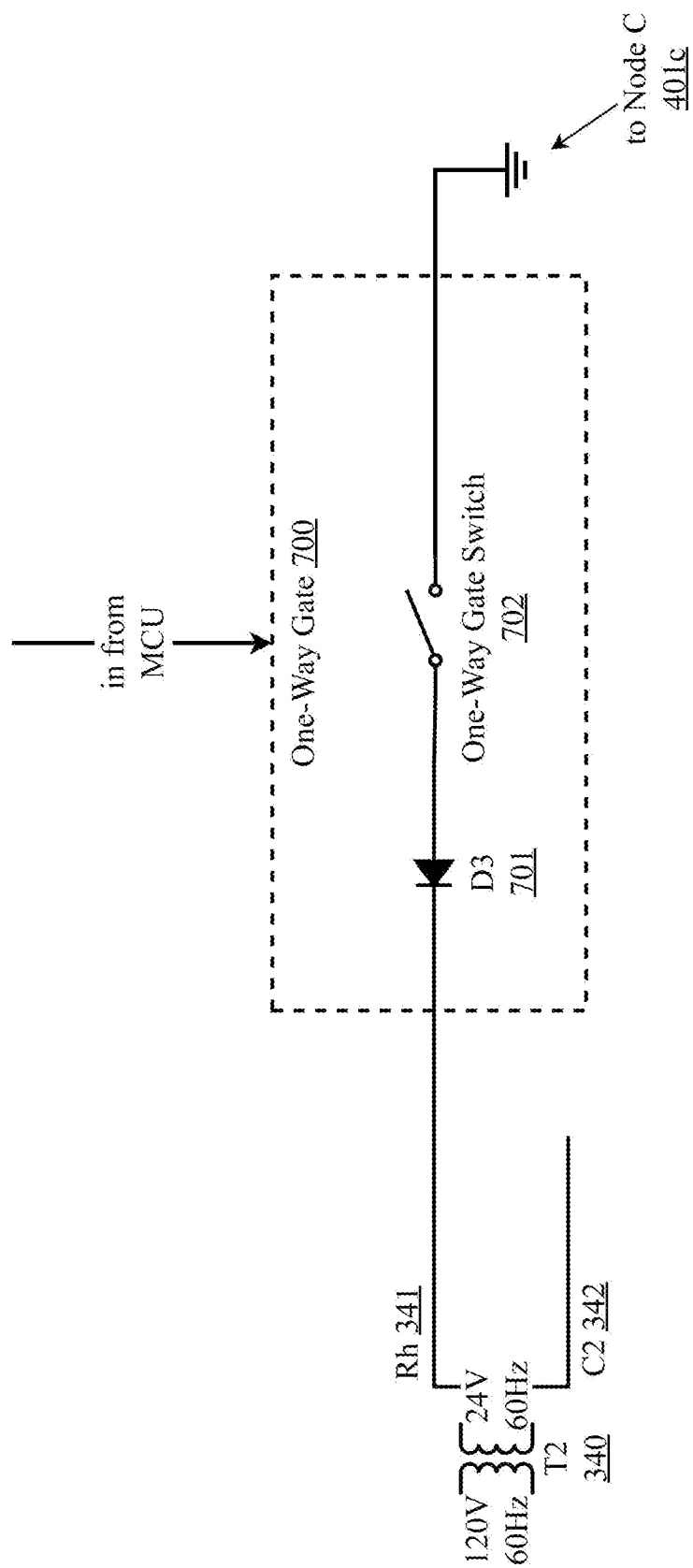
FIG. 7 is a schematic of an exemplary one-way gate aspect of a system for automatic wire detection and handling of HVAC smart controllers.

FIG. 7 is a schematic of an exemplary one-way gate aspect of a system for automatic wire detection and handling of HVAC smart controllers. One-way gate 700 provides protection against damage that could be caused by connection of T1 320 and T2 340. One-way gate 700 comprises a diode D3 701 which allows current to flow only in the negative direction along Rh 341 (i.e., from smart thermostat 350 toward T2 340) and a switch 702 controlled by MCU 370 which, when connected, allows current to flow when Rh is on the negative portion of its AC power and C2 342 is on positive cycle of the AC power (and connected to the internal ground Node C 401c).

As an additional protective measure, the timing of closure of the one-way gate can be limited in such a way that a signal can be detected, but the connection is not long enough to allow for damage to occur either to the smart thermostat or the HVAC system. The signal on Rh 341 is in the form of an AC signal. The period of that AC signal will depend on the frequency of the mains AC supply. For 60 Hz North American mains AC supply, the period of the AC signal on Rh 341 will be 16.66 milliseconds (ms). For 50 Hz European and Asian mains AC supply, the period of the AC signal on Rh 341 will be 20 milliseconds (ms). Thus, to capture at least two periods of an AC signal, the one-way gate should be open a minimum of 33 ms. However, to prevent damage either to the smart thermostat or HVAC system from possible connection of two different transformers (via Rc and Rh), the one-way gate should be closed within a relatively short time. This time is variable, but a reasonable compromise is to leave the gate open for between two periods and ten periods, which allows enough periods to confirm the signal but not such a long connection as to cause system damage. In one embodiment, the one-way gate is kept open for 100 ms, which allows for capture of 4-5 periods in either 60 Hz or 50 Hz, but no more than six periods in either.

Figure 8:
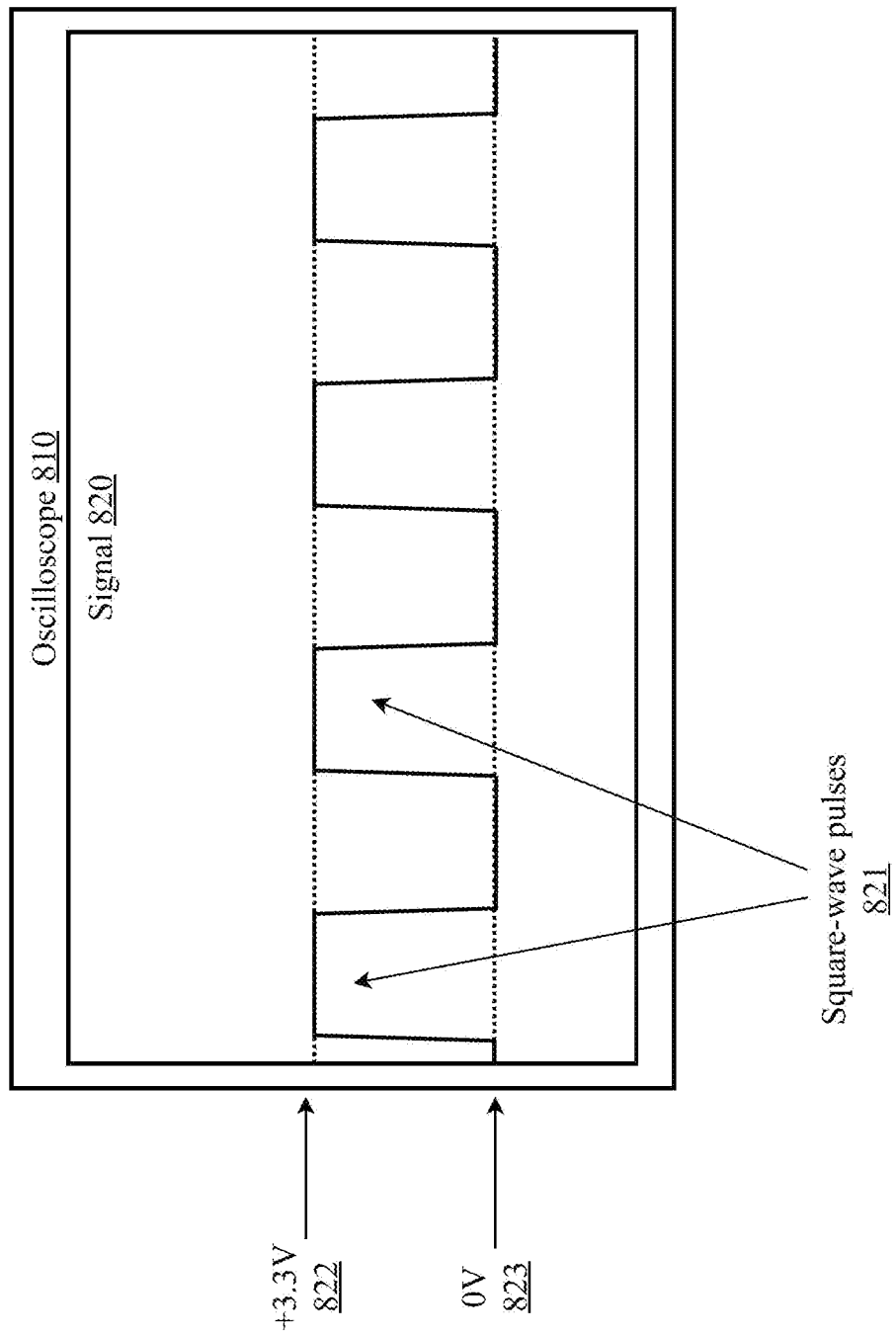
FIG. 8 is an illustration of an exemplary conditioned signal of an HVAC channel through a voltage and current limiter.

FIG. 8 is an illustration of an exemplary conditioned signal from an HVAC channel. Here, an exemplary oscilloscope screen 810 is shown displaying an exemplary signal 820 from Node 5 352. The signal at Node 5 352 comes from voltage and current limiter 500, which both reduces current and clamps the voltage at a maximum of 3.3V. As the input to voltage and current limiter 500 is a half-wave rectified signal, the output of voltage and current limiter 500 at Node 5 352 is a series of square-wave pulses 821 with a maximum voltage of 3.3V 822 and a minimum voltage of 0V 823.

FIG. 9 is an illustration of an exemplary equipment connection truth table for connection of HVAC systems to terminals of a smart thermostat. An equipment connection truth table 900 such as the one shown can be used to develop additional algorithms for intelligent detection algorithm 600. Here, a truth table for a standard HVAC configuration is shown with equipment types 901-910 shown in the left-hand column and wires needed to operate the equipment shown in subsequent columns (where "Y" means "yes," the wire is needed). The "Ref." column indicates one of two conditions, either that 1) a brief Rh-to-ground connection must be made during initial setup only to determine whether Rh exists and whether the system is dual transformer, or 2) a permanent Rh-to-ground connection must be made where a second transformer is being used (i.e., when Rh signal is present along with Rc signal). The "Rc-Rh" column indicates that Rc-Rh shorting relay 353 is engaged which occurs when the system has conventional heating and only one transformer. In that case, W1 and W2 are both driven by power from Rh, so to drive the W1 or W2 outputs, Rc and Rh must be shorted (in current standard configurations of HVAC systems and smart thermostats).

Where the HVAC system has 1-stage cooling only 901, Rc, C, G, and Y1 are needed. Where the HVAC system has 2-stage cooling only 902, Rc, C, G, Y1, and Y2 are needed. Where the HVAC system has 1-stage conventional heating only 903, Rh, C2, G, W1, and a jumper between Rc and Rh are needed. Where the HVAC system has 2-stage conventional heating only 904, Rh, C2, G, W1, W2, and a jumper between Rc and Rh are needed. Where the HVAC system has both cooling and heating using a 1-stage heatpump 905, Rc, C, G, Y1, and OB are needed. Where the HVAC system has both cooling and heating using a 2-stage heatpump 906, Rc, C, G, Y1, Y2, and OB are needed. Where the HVAC system has cooling with 1-stage conventional heating 907 on a single transformer, Rc, C, G, Y1, W1, and a jumper between Rc and Rh are needed. Where the HVAC system has cooling with 2-stage conventional heating 908 on a single transformer, Rc, C, G, Y1, W1, W2, and a jumper between Rc and Rh are needed. Where the HVAC system has cooling with conventional 1-stage heating 909 on a dual transformer, Rc, C, Rh, G, Y1, and W1 are needed. Where the HVAC system has cooling with conventional 2-stage heating 910 on a dual transformer, Rc, C, Rh, G, Y1, Y2, W1, and W2 are needed.

Figure 10:
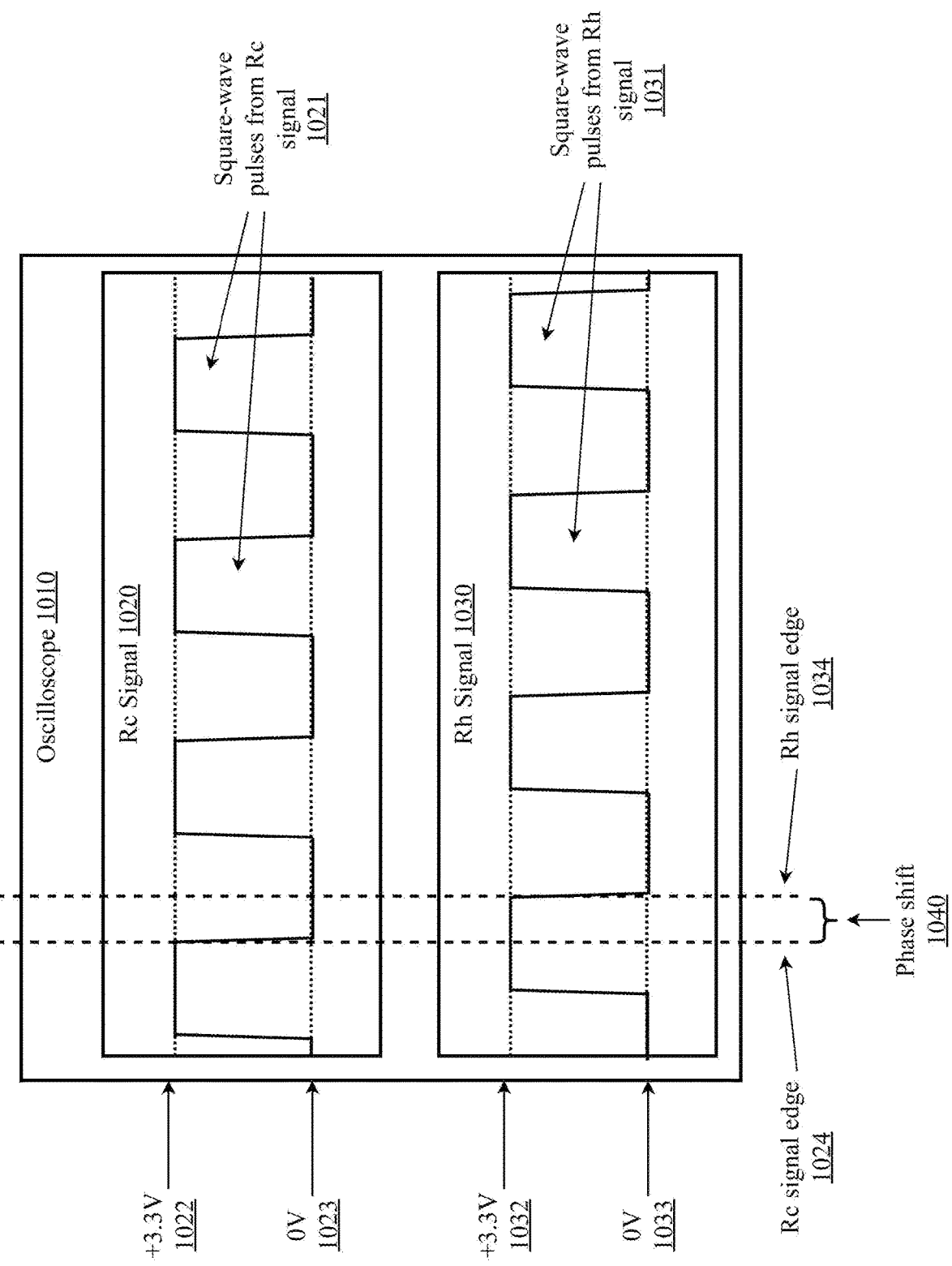
FIG. 10 is an illustration of an exemplary method for identifying two different transformers in an HVAC system using conditioned signals from different HVAC channels.

FIG. 10 is an illustration of an exemplary method for identifying two different transformers in an HVAC system using conditioned signals from different HVAC channels. Under some circumstances, a phase shift may exist between different transformers of the same HVAC system. Here, an exemplary oscilloscope screen 1010 is shown displaying an two exemplary signals as outputs from voltage and current limiter 500, an Rc signal 1020 and an Rh signal 1030. Each signal 1020, 1030 comes from a separate instance of voltage and current limiter 500, which both reduces current and clamps the voltage at a maximum of 3.3V. As the input to voltage and current limiter 500 for each signal 1020, 1030 is a half-wave rectified signal, the output of voltage and current limiter 500 for each signal is a series of square-wave pulses 1021, 1031 with a maximum voltage for each signal of 3.3V 1022, 1032 and a minimum voltage for each signal of 0V 1023, 1033. In this example, detection of dual-transformers is performed by analyzing a phase shift 1040 between the signals 1020, 1030 as determined by identifying an Rc signal edge 1024 of Rc signal 1020 and an Rh signal edge 1034 of Rh signal 1030. If there is no phase shift, then Rc signal 1020 and Rh signal 1030 is indeterminate. T1 320 and T2 340 may be the same transformer or may simply be producing the same wave form because they are both connected to the same mains power supply. If there is a phase shift, then Rc signal 1020 and Rh signal 1030 are likely produced by different transformers. While detection of phase shift is performed in this example using trailing signal edges (also known as falling signal edges) 1024, 1034, this example is not intended to be limiting and other methods of determining a phase shift (e.g., leading signal edges or rising signal edges) may be used.

When comparing Rc with Rh in the manner of this example, either separate voltage and current limiters 500 must be used for the signals from each of Rc and Rh so as to maintain separate signals for phase shift comparison or a different algorithm must be used (e.g., detecting not phase shift, but lengthened or shortened pulses in the combined signal) to identify both Rc and Rh on the same conditioned signal.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Figure 11:
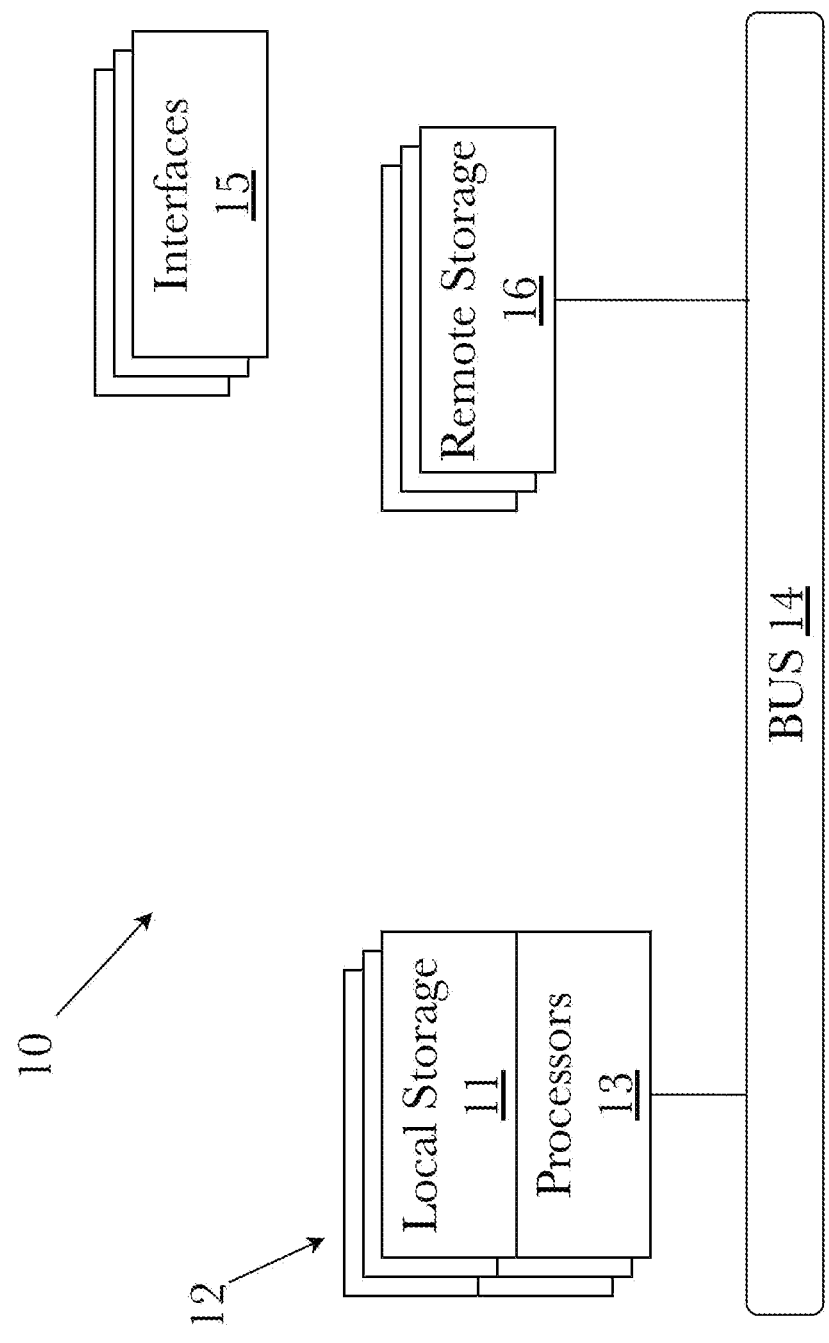
FIG. 11 is a block diagram illustrating an exemplary hardware architecture of a computing device.

Referring now to FIG. 11, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some aspects, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random access memory (RAM) and/or read-only memory (ROM), including for example one or more levels of cached memory, may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical terminals appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 11 illustrates one specific architecture for a computing device 10 for implementing one or more of the aspects described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, a single processor 13 handles communications as well as routing computations, while in other aspects a separate dedicated communications processor may be provided. In various aspects, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the aspects described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device aspects may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 12:
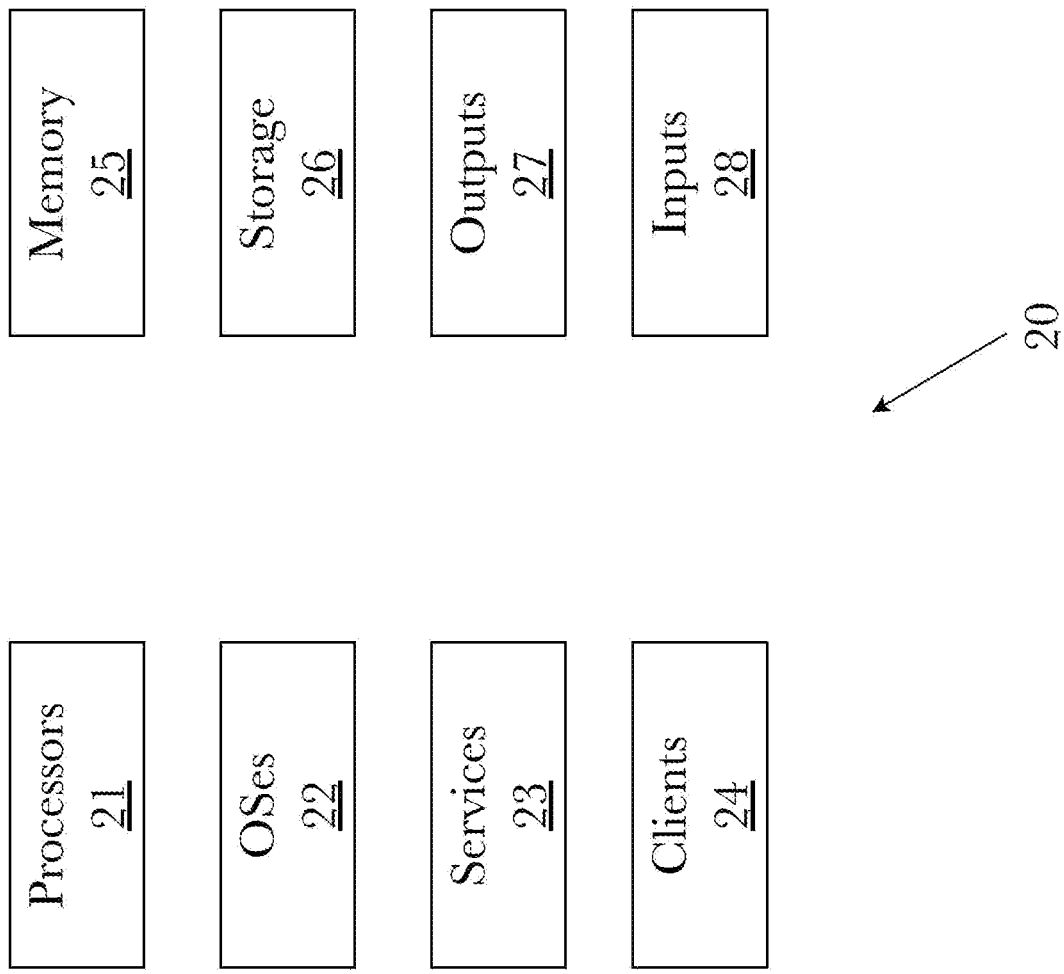
FIG. 12 is a block diagram illustrating an exemplary logical architecture for a client device.

In some aspects, systems may be implemented on a standalone computing system. Referring now to FIG. 12, there is shown a block diagram depicting a typical exemplary architecture of one or more aspects or components thereof on a standalone computing system. Computing device 20 includes processors 21 that may run software that carry out one or more functions or applications of aspects, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 11). Examples of storage devices 26 include flash memory, magnetic hard drive, CD-ROM, and/or the like.

Figure 13:
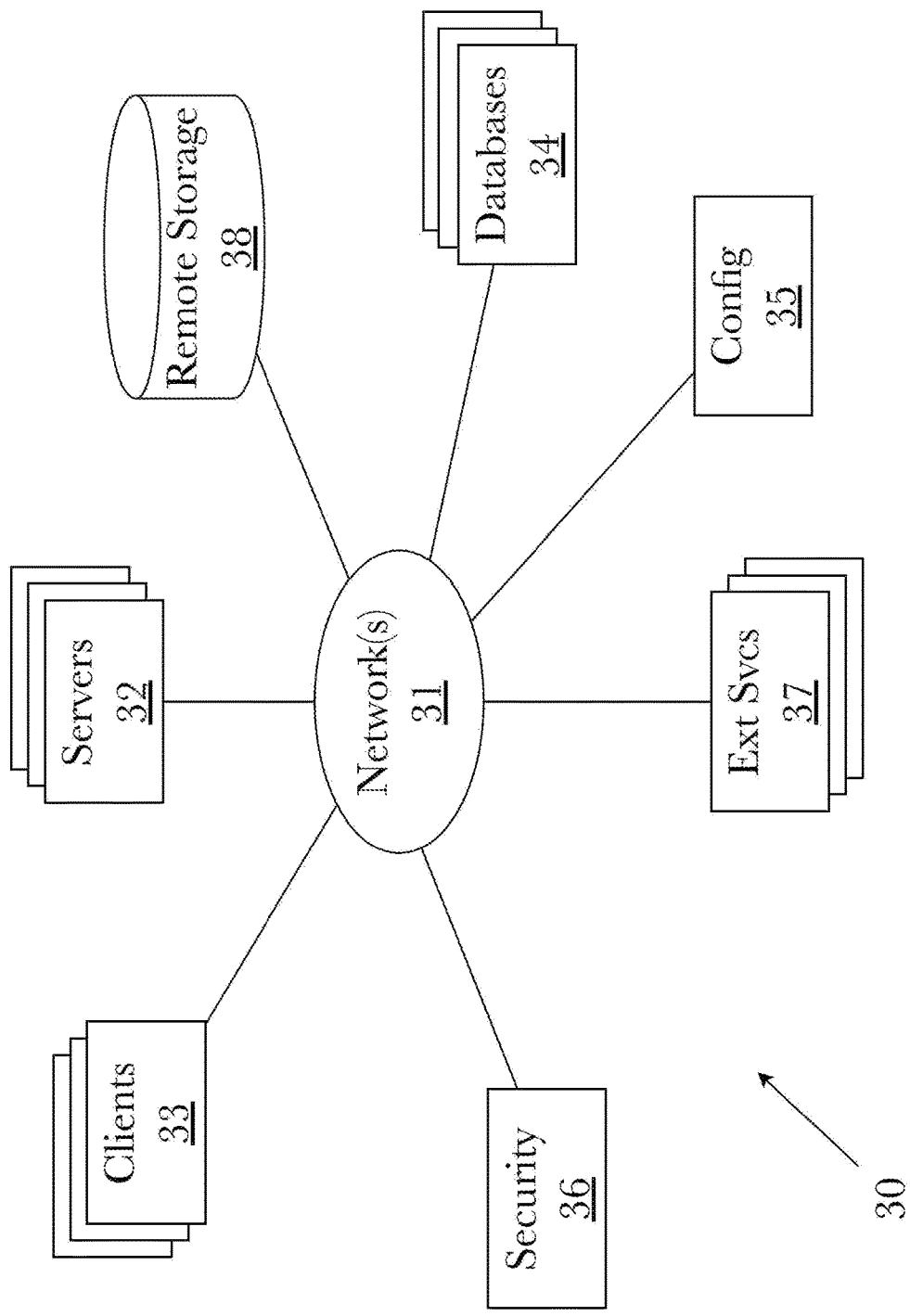
FIG. 13 is a block diagram showing an exemplary architectural arrangement of clients, servers, and external services.

In some aspects, systems may be implemented on a distributed computing network, such as one having any number of clients and/or servers. Referring now to FIG. 13, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 12. In addition, any number of servers 32 may be provided for handling requests received from one or more clients 33. Clients 33 and servers 32 may communicate with one another via one or more electronic networks 31, which may be in various aspects any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some aspects, servers 32 may call external services 37 when needed to obtain additional information, or to refer to additional data concerning a particular call. Communications with external services 37 may take place, for example, via one or more networks 31. In various aspects, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises. In addition to local storage on servers 32, remote storage 38 may be accessible through the network(s) 31.

In some aspects, clients 33 or servers 32 (or both) may make use of one or more specialized services or appliances that may be deployed locally or remotely across one or more networks 31. For example, one or more databases 34 in either local or remote storage 38 may be used or referred to by one or more aspects. It should be understood by one having ordinary skill in the art that databases in storage 34 may be arranged in a wide variety of architectures and using a wide variety of data access and manipulation means. For example, in various aspects one or more databases in storage 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some aspects, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some aspects may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with aspects without limitation, unless a specific security 36 or configuration system 35 or approach is specifically required by the description of any specific aspect.

Figure 14:
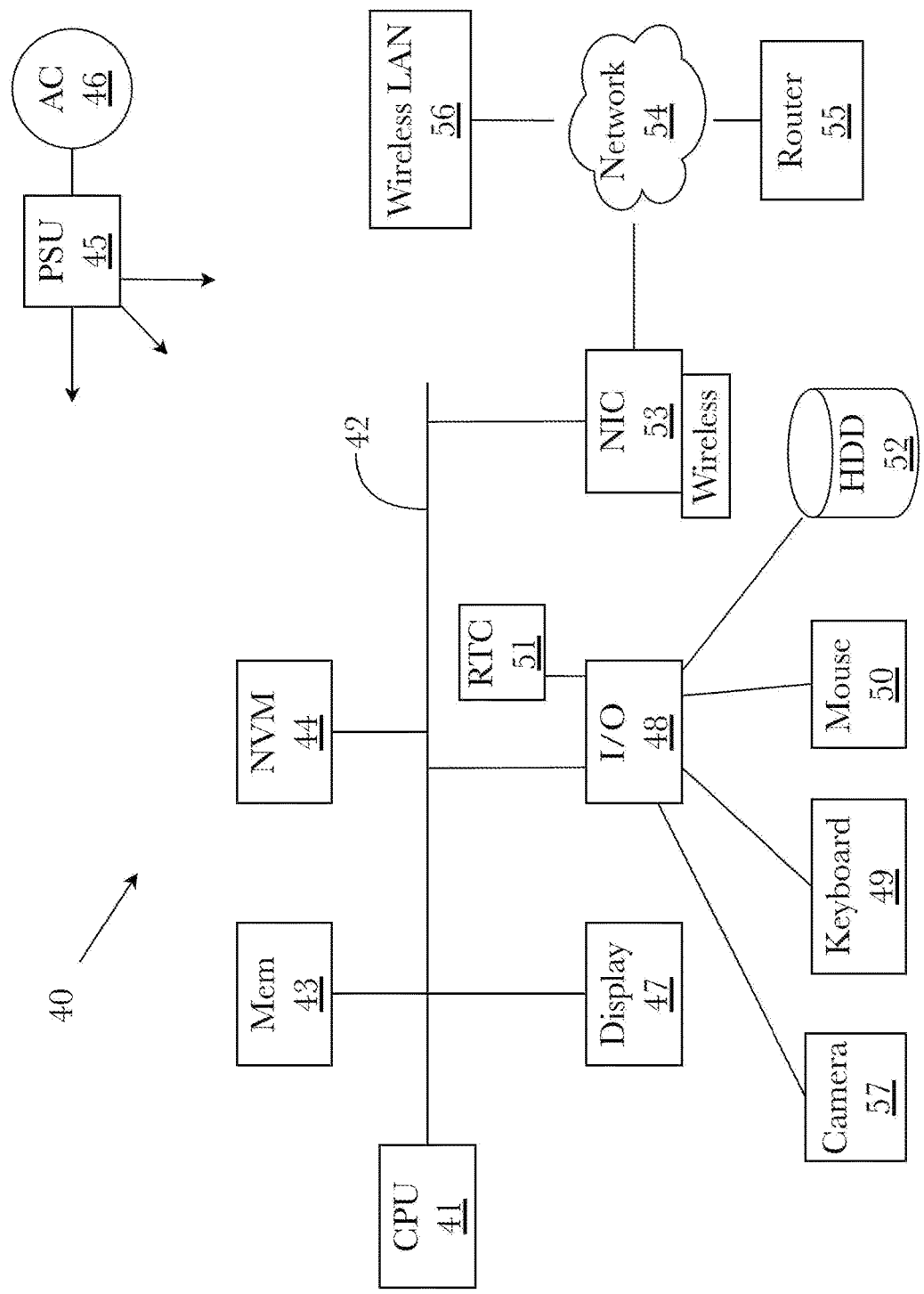
FIG. 14 is another block diagram illustrating an exemplary hardware architecture of a computing device.

FIG. 14 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may typically, be connected to peripherals such as a keyboard 49, pointing device 50, hard disk 52, real-time clock 51, a camera 57, and other peripheral devices. NIC 53 connects to network 54, which may be the Internet or a local network, which local network may or may not have connections to the Internet. The system may be connected to other computing devices through the network via a router 55, wireless local area network 56, or any other network connection. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various aspects, functionality for implementing systems or methods of various aspects may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various aspects described above. Accordingly, the present invention is defined by the claims and their equivalents.

What is claimed is:

1. A system for automatic wire detection and handling of Rc, Rh, and W wires for heating, ventilation, and air conditioning (HVAC) smart controllers, comprising:
   a computing device comprising a processor, a memory, and a plurality of electrical pins, wherein:
      a first electrical input pin is electrically connected to a first wire terminal through a first voltage and current limiter circuit;
      a second electrical input pin is electrically connected to a second wire terminal through a second voltage and current limiter circuit; and
      a third electrical input pin is electronically connected to a third wire terminal through a third voltage and current limiter circuit;
   an internal ground comprising an electrical connection to the zero-volt direct current node of a alternating current (AC) to direct current (DC) rectifier configured to rectify an AC signal from a first transformer across the first terminal and the third terminal;
   a one-way gate comprising a diode configured to allow current to flow in a single direction from the internal ground through the second wire terminal toward a possible second transformer of the HVAC system, and a first electronically-controllable switch operable by the computing device to make and break an electrical connection between the internal ground and the possible second transformer through the diode;
   the first voltage and current limiter circuit, configured to reduce an electrical signal from the first HVAC system control wire to a voltage and current compatible with the first electrical input pin of the computing device;
   the second voltage and current limiter circuit, configured to reduce an electrical signal from the second HVAC system control wire to a voltage and current compatible with the second electrical input pin of the computing device;
   the third voltage and current limiter circuit, configured to reduce an electrical signal from the third HVAC system control wire to a voltage and current compatible with the third electrical input pin of the computing device;
   a detection algorithm comprising a plurality of programming instructions stored in the memory which, when operating on the processor, causes the computing device to:

determine whether a first electrical signal exists on the first electrical input pin which is indicative of connection of a first HVAC system control wire to the first wire terminal;

determine whether a second electrical signal exists on the second electrical pin which is indicative of connection of a second HVAC system control wire connected to the second wire terminal;

close the one-way gate;

re-determine whether a second electrical signal exists on the second electrical pin; and open the one-way gate.

2. The system of claim 1, wherein:

the computing device further comprises a fourth electrical input pin being electrically connected to a fourth wire terminal through a fourth voltage and current limiter circuit;

the system further comprises a fourth voltage and current limiter circuit, configured to reduce an electrical signal from the fourth HVAC system control wire to a voltage and current compatible with the fourth electrical input pin of the computing device; and the detection algorithm is further configured to cause the computing device to:

determine whether a third electrical signal exists on the fourth electrical input pin which is indicative of connection of a fourth HVAC system control wire to the fourth wire terminal.

3. The system of claim 2, wherein:

the first HVAC system control wire is a 24V AC power wire for a first subsystem of the HVAC system;

the second HVAC system control wire is a 24V AC power wire for a second subsystem of the HVAC system;

the third HVAC system control wire is a ground wire for the 24V AC power wire of the first HVAC system control wire; and the fourth HVAC system control wire is a control wire for operating the second subsystem of the HVAC system.

4. The system of claim 3, wherein:

the first HVAC system control wire is the Rc wire of the HVAC system connected to the transformer;

the first subsystem is a cooling coil of the HVAC system;

the second HVAC system control wire is the Rh wire of the HVAC system;

the second subsystem is a heating coil of the HVAC system;

the third HVAC control wire is the C wire of the HVAC system connected to the transformer;

the fourth HVAC control wire is the W wire of the HVAC system which controls operation of the heating coil.

5. The system of claim 4, wherein:

the system further comprises a second electronically-controllable switch between the Rh and Rc wires; and the detection algorithm is further configured to apply the following algorithm to classify the Rh and W HVAC system control wires:

where neither the third electrical signal nor second electrical signal is detected:

close the one-way gate to connect the internal ground to the Rh wire using the first electronically-controllable switch;

recheck for the third electrical signal; and where the third electrical signal is detected upon recheck, associate both the Rh and W HVAC system control wires with the possible second transformer of the HVAC system;

where the third electrical signal is detected but the second electrical signal is not, associate both the Rh and W HVAC system control wires with the first transformer of the HVAC system and connect the Rc and Rh HVAC system control wires via the shorting relay using the second electronically-controllable switch; and where either the third electrical signal and the second electrical signal are both detected; or the third electrical signal is not detected but the second electrical signal is detected;

associate both the Rh and W HVAC system control wires with the first transformer of the HVAC system.

6. The system of claim 1, wherein the closure of the one-way gate is timed to further limit any potential damage to the computing device or HVAC system wherein:

the closure of the one-way gate is long enough to capture at least two periods of, and no more than 10 periods of, any signal on the second HVAC control wire.

7. The system of claim 6, wherein the closure of the one-way gate is less than or equal to 100 milliseconds.

8. A system for automatic wire detection and handling of Rc, Rh, and W wires for heating, ventilation, and air conditioning (HVAC) smart controllers, comprising:

a computing device comprising a processor, a memory, an electrical input pin, and an electrical output pin;

a channel selector comprising one or more electronically-controlled switches controllable by the electrical output pin configured to route signals from one or more HVAC control wires through a voltage and current limiter to the electrical input pin;

an internal ground comprising an electrical connection to the zero-volt direct current node of a alternating current (AC) to direct current (DC) rectifier configured to rectify an AC signal from a first transformer across a first wire terminal and a third wire terminal;

a one-way gate comprising a diode configured to allow current to flow in a single direction from the internal ground through the second wire terminal toward a possible second transformer of the HVAC system, and a first electronically-controllable switch controllable by the electrical output pin to make and break an electrical connection between the internal ground and the possible second transformer through the diode;

a voltage and current limiter circuit configured to reduce an electrical signal from an HVAC system control wire to a voltage and current compatible with the electrical input pin of the computing device;

a detection algorithm comprising a plurality of programming instructions stored in the memory which, when operating on the processor, causes the computing device to:

make a first connection with a first wire terminal by selecting a channel using the channel selector, the first connection being routed from the first wire terminal through the voltage and current limiter circuit to the electrical input pin of the computing device;

determine via the electrical input pin whether a first electrical signal exists on the first connection which is indicative of connection of a first HVAC system control wire to an HVAC system via the first terminal;

make a second connection with a second wire terminal by selecting a channel using the channel selector, the second connection being routed from the second wire terminal through the voltage and current limiter circuit to the electrical input pin of the computing device;
determine via the electrical input pin whether a second electrical signal exists on the second connection which is indicative of connection of a second HVAC system control wire to an HVAC system via the second terminal;
close the one-way gate;
re-determine via the electrical input pin whether a second electrical signal exists on the second connection; and
open the one-way gate.

9. The system of claim 8, wherein the detection algorithm is further configured to cause the computing device to:
make a third connection with a fourth wire terminal by selecting a channel using the channel selector, the third connection being routed from the fourth wire terminal through the voltage and current limiter circuit to the electrical input pin of the computing device;
determine via the electrical input pin whether a third electrical signal exists on the third connection which is indicative of connection of a third HVAC system control wire to an HVAC system via the fourth terminal.

10. The system of claim 9, wherein:
the first HVAC system control wire is a 24V AC power wire for a first subsystem of the HVAC system;
the second HVAC system control wire is a 24V AC power wire for a second subsystem of the HVAC system;
a third HVAC system control wire is a ground wire for the 24V AC power wire of the first HVAC system control wire connected to the third wire terminal; and
the fourth HVAC system control wire is a control wire for operating the second subsystem of the HVAC system.

11. The system of claim 10, wherein:
the first HVAC system control wire is the Rc wire of the HVAC system connected to the transformer;
the first subsystem is a cooling coil of the HVAC system;
the second HVAC system control wire is the Rh wire of the HVAC system;
the second subsystem is a heating coil of the HVAC system;
the third HVAC control wire is the C wire of the HVAC system connected to the transformer;
the fourth HVAC control wire is the W wire of the HVAC system which controls operation of the heating coil.

12. The system of claim 11, wherein:
the system further comprises a second electronically-controllable switch between the Rh and Rc wires; and
the detection algorithm is further configured to apply the following algorithm to classify the Rh and W HVAC system control wires:
where neither the third electrical signal nor second electrical signal is detected:
close the one-way gate to connect the internal ground to the Rh wire using the first electronically-controllable switch;
recheck for the third electrical signal; and
where the third electrical signal is detected upon recheck, associate both the Rh and W HVAC system control wires with the possible second transformer of the HVAC system;
where the third electrical signal is detected but the second electrical signal is not, associate both the Rh and W HVAC system control wires with the first transformer of the HVAC system and connect the Rc and Rh HVAC system control wires via the shorting relay using the second electronically-controllable switch; and
where either
the third electrical signal and the second electrical signal are both detected; or
the third electrical signal is not detected but the second electrical signal is detected;
associate both the Rh and W HVAC system control wires with the first transformer of the HVAC system.

13. The system of claim 8, wherein the closure of the one-way gate is timed to further limit any potential damage to the computing device or HVAC system wherein:
the closure of the one-way gate is long enough to capture at least two periods of, and no more than 10 periods of, any signal on the second HVAC control wire.

14. The system of claim 13, wherein the closure of the one-way gate is less than or equal to 100 milliseconds.

15. A method for automatic wire detection and handling of Rc, Rh, and W wires for heating, ventilation, and air conditioning (HVAC) smart controllers, comprising the steps of:
operating a detection algorithm on a computing device comprising a processor, a memory, and one or more electrical input pins, the detection algorithm comprising a plurality of programming instructions stored in the memory which, when operating on the processor, causes the computing device to perform the steps of:
making a first connection from a first wire terminal, through a voltage and current limiter circuit configured to reduce an electrical signal from an HVAC system control wire to a voltage and current compatible with an electrical input pin of the computing device, to that electrical input pin, and determining via that electrical input pin whether a first electrical signal exists on the first connection which is indicative of connection of the first HVAC system control wire to the first wire terminal;
making a first connection from a first wire terminal, through a voltage and current limiter circuit configured to reduce an electrical signal from an HVAC system control wire to a voltage and current compatible with an electrical input pin of the computing device, to that electrical input pin, and determining via that electrical input pin whether a second electrical signal exists on the second connection which is indicative of connection of the second HVAC system control wire to the second wire terminal;
determining via the electrical input pin whether a second electrical signal exists on the second connection which is indicative of connection of the second HVAC system control wire to the HVAC system;
establishing an internal ground comprising an electrical connection to the zero-volt direct current node of a alternating current (AC) to direct current (DC) rectifier configured to rectify an AC signal from a first transformer across the first wire terminal and a third wire terminal;
closing a one-way gate, the one-way gate comprising a diode configured to allow current to flow in a single direction from the internal ground through the second wire terminal toward a possible second transformer of the HVAC system, and a first electronically-controllable switch controllable by the electrical output pin to make and break an electrical connection between the internal ground and the possible second transformer through the diode;

re-determining via the electrical input pin whether a second electrical signal exists on the second connection; and closing the one-way gate.

16. The method of claim 15, further comprising the steps of using the detection algorithm to cause the computing device to perform the following steps:

a third connection with a third HVAC system control wire routed to an electrical input pin of the computing device through a voltage and current limiter circuit configured to reduce an electrical signal from an HVAC system control wire to a voltage and current compatible with the electrical input pin of the computing device, with the one-way gate configured to allow current to flow only toward a transformer of an HVAC system providing power to an HVAC system control wire; and determining via the electrical input pin whether a third electrical signal exists on the third connection which is indicative of connection of the third HVAC system control wire to the HVAC system.

17. The method of claim 16, wherein:

the first HVAC system control wire is a 24V AC power wire controlling a first subsystem of the HVAC system; and the second and third HVAC system control wires are both 24V AC power wires controlling a second subsystem of the HVAC system.

18. The method of claim 17, wherein:

the first HVAC system control wire is the Rc wire of the HVAC system;

the first subsystem is a cooling coil of the HVAC system;

the second HVAC system control wire is the Rh wire of the HVAC system;

the third HVAC control wire is the W wire of the HVAC system; and the second subsystem is a heating coil of the HVAC system.

19. The method of claim 18, further comprising the steps of:

establishing a second electronically-controllable switch between the Rh and Rc wires; and further configuring the detection algorithm to apply the following algorithm to classify the Rh and W HVAC system control wires:

where neither the third electrical signal nor second electrical signal is detected:

close the one-way gate to connect the internal ground to the Rh wire using the first electronically-controllable switch;

recheck for the third electrical signal; and where the third electrical signal is detected upon recheck, associate both the Rh and W HVAC system control wires with the possible second transformer of the HVAC system;

where the third electrical signal is detected but the second electrical signal is not, associate both the Rh and W HVAC system control wires with the first transformer of the HVAC system and connect the Rc and Rh HVAC system control wires via the shorting relay using the second electronically-controllable switch; and where either the third electrical signal and the second electrical signal are both detected; or the third electrical signal is not detected but the second electrical signal is detected;

associate both the Rh and W HVAC system control wires with the first transformer of the HVAC system.

20. The method of claim 15, further comprising the step of timing the closure of the one-way gate to further limit any potential damage to the computing device or HVAC system wherein:

the closure of the one-way gate is long enough to capture at least two periods of, and no more than 10 periods of, any signal on the second HVAC control wire.

* * * * *